(12) United States Patent
Yamada

(10) Patent No.: US 8,947,586 B2
(45) Date of Patent: Feb. 3, 2015

(54) DIAPHRAGM CONTROL APPARATUS OF INTERCHANGEABLE LENS CAMERA

(71) Applicant: Pentax Ricoh Imaging Company, Ltd., Tokyo (JP)

(72) Inventor: Toshiaki Yamada, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 53 days.

(21) Appl. No.: 13/793,160

(22) Filed: Mar. 11, 2013

(65) Prior Publication Data

US 2013/0242176 A1    Sep. 19, 2013

(30) Foreign Application Priority Data

Mar. 15, 2012  (JP) .................................. 2012-058688

(51) Int. Cl.
*H04N 5/238*        (2006.01)

(52) U.S. Cl.
CPC ...................................... *H04N 5/238* (2013.01)
USPC ......................................................... 348/363

(58) Field of Classification Search
USPC ................... 348/362, 363; 396/257, 260–263
See application file for complete search history.

(56) References Cited

U.S. PATENT DOCUMENTS

| | | | |
|---|---|---|---|
| 5,084,754 A * | 1/1992 | Tomitaka ....................... | 348/363 |
| 7,970,273 B2 | 6/2011 | Yamada et al. | |
| 7,970,274 B2 * | 6/2011 | Yamada et al. ............... | 396/260 |
| 7,974,530 B2 | 7/2011 | Yamada et al. | |
| 8,285,136 B2 | 10/2012 | Tsujiyama | |
| 2010/0220990 A1 * | 9/2010 | Tsujiyama .................... | 396/260 |
| 2010/0329658 A1 * | 12/2010 | Yamada et al. ............... | 396/260 |
| 2013/0195436 A1 * | 8/2013 | Yamada et al. ............... | 396/260 |

FOREIGN PATENT DOCUMENTS

JP    2011-028241    2/2011

OTHER PUBLICATIONS

U.S. Appl. No. 13/737,202 to Toshiaki Yamada et al., filed Jan. 9, 2013.

* cited by examiner

*Primary Examiner* — Aung S Moe
*Assistant Examiner* — Amy Hsu
(74) *Attorney, Agent, or Firm* — Greenblum & Bernstein P.L.C.

(57) ABSTRACT

A diaphragm control apparatus of an interchangeable lens camera includes a photographing lens, a diaphragm control slider which is driven between first and second control ends corresponding to maximum and minimum apertures, a position detector, and a controller which drives the diaphragm control slider toward the first control end at high-speed, stores in a memory, as a temporary origin, a position to which the diaphragm control slider has rebounded after reaching the first control end. Thereafter, the controller compares the current position of the diaphragm control slider with the temporary origin while driving the diaphragm control slider at a low-speed towards the first control end. When the current position is within a predetermined range of the temporary origin, the controller determines the current position as the origin of the diaphragm control slider.

17 Claims, 10 Drawing Sheets

113: Diaphragm Device
111: AF Mechanism
47: AF System
49: Diaphragm Drive Control Circuit
51: Diaphragm Control Mechanism

DIAPHRAGM CONTROL APPARATUS OF INTERCHANGEABLE LENS CAMERA

BACKGROUND OF THE INVENTION

1. Field of the Invention

The present invention relates to a diaphragm control apparatus of an interchangeable lens camera.

2. Description of the Related Art

In the related art, a diaphragm control apparatus of interchangeable lens camera is disclosed, in which the interchangeable lens camera is provided with a photographing lens (interchangeable lens) having a diaphragm device, which varies the aperture of a diaphragm between a maximum aperture (i.e. fully-open state) and a minimum aperture (i.e. fully stopped-down state); and a camera body, to which the photographing lens can be detachably mounted, provided with a stepping motor which drives the diaphragm device in opening/closing directions in a lens-mounted state. The camera body is provided with a diaphragm control slider which is stepwisely driven (moved) between a first movement extremity (end), corresponding to the maximum aperture of the diaphragm device within the photographing lens, and a second movement extremity (end), corresponding to the minimum aperture of the diaphragm device within the photographing lens, via a stepping motor.

In such a type of diaphragm control apparatus of interchangeable lens camera, when an initialization-process command signal, which commands an initialization process to commence in the camera body, is inputted, the initialization process is performed in which the diaphragm control slider is moved via the stepping motor to an origin, which is the first movement extremity corresponding to the maximum aperture of the diaphragm device or the close vicinity of the first movement extremity.

An example of the related art is disclosed in Japanese Unexamined Patent Publication No. 2011-28241.

However, in the initialization process of the related art, no consideration has been given in regard to the influence of the rebound (bounce) of the diaphragm control slider when the diaphragm control slider reaches the first movement extremity. Accordingly, when the diaphragm control slider is positioned at a distal end (e.g., the second movement extremity or a position in the close vicinity thereof) from the first movement extremity at the instant the initialization-process command signal has been input, the amount of rebound of the diaphragm control slider at the first movement extremity (with the movement speed reaching its maximum movement speed) is large, so that the origin of the diaphragm control slider cannot be precisely determined in a short space of time.

SUMMARY OF THE INVENTION

The present invention has been devised in consideration of the above-described problems of the related art, and provides a diaphragm control apparatus of an interchangeable lens camera in which, in an initialization process, the amount of rebound of the diaphragm control slider when the diaphragm control slider reaches the first movement extremity is suppressed, so that the origin of the diaphragm control slider can be precisely determined in a short space of time.

According to an aspect of the present invention, a diaphragm control apparatus of an interchangeable lens camera is provided, including a photographing lens provided with an adjustable diaphragm device, in which an aperture thereof is changeable between a maximum aperture and a minimum aperture; a camera body to which the photographing lens is detachably attached, the camera body being provided with a stepping motor for driving the diaphragm device to change between the maximum aperture and the minimum aperture in a state in which the photographing lens is attached to the camera body; a diaphragm control slider provided in the camera body, wherein the diaphragm control slider is driven by the stepping motor between a first control end that corresponds to the maximum aperture of the diaphragm device and a second control end that corresponds to the minimum aperture of the diaphragm device; a position detector provided in the camera body, wherein the position detector detects the position of the diaphragm control slider; an input device, into which an initialization-process command signal is inputted, wherein the initialization-process command signal commands an initialization process to commence in the camera body; and a controller which, upon the initialization-process command signal being input to the input device, drives the diaphragm control slider toward the first control end at high-speed in a stepwise manner via the stepping motor, stores in a memory, as a temporary origin, a position detected by the position detector to which the diaphragm control slider has rebounded after reaching the first control end, and after the diaphragm control slider has rebounded, the controller compares a current position of the diaphragm control slider which is detected by the position detector with the temporary origin while activating the stepping motor to move the diaphragm control slider at a low-speed towards the first control end. When the current position of the diaphragm control slider detected by the position detector is within a predetermined range of the temporary origin, the controller determines the current position as the origin of the diaphragm control slider.

It is desirable for the camera body to be provided with a diaphragm-control-slider biasing spring which biases the diaphragm control slider toward the first control end.

It is desirable for the photographing lens to include a diaphragm operatively-associated rod which opens and shuts the diaphragm device between the maximum aperture and the minimum aperture by being rotated via the operatively associated movement of the diaphragm control slider provided in the camera body, and a diaphragm operatively-associated-rod biasing spring which biases the diaphragm operatively-associated rod toward the minimum aperture of the diaphragm device.

It is desirable for the biasing force of the diaphragm control slider via the diaphragm-control-slider biasing spring to be set smaller than the biasing force of the diaphragm operatively-associated rod via the diaphragm operatively-associated-rod biasing spring.

It is desirable for the camera body to include a power switch for performing an input operation for switching between a power ON state in which the stepping motor is capable of being energized, and a power OFF state in which the stepping motor is not capable of being energized. The initialization-process command signal is inputted into the input device when the input operation, for switching the stepping motor from a power OFF state to a power ON state, is performed via the power switch.

It is desirable for the camera body to include an attachment determiner which determines whether or not the photographing lens is attached to the camera body, wherein, in the power ON state with the photographing lens detached from the camera body while the stepping motor is energized, the initialization-process command signal is input into the input device when the attachment determiner determines that the photographing lens is attached to the camera body.

It is desirable for the position detector to include a pair of permanent magnets which are mounted on the diaphragm control slider and which move integrally with the diaphragm control slider, and a Hall sensor fixed on an intermediate position between the first control end and the second control end. When the controller moves the diaphragm control slider in a stepwise manner from the second control end to the first control end, the controller progressively accelerates the stepwise movement speed of the diaphragm control slider until the diaphragm control slider reaches a maximum proximity position between the permanent magnets and the Hall sensor, and thereafter the controller progressively decelerates the stepwise movement speed of the diaphragm control slider after the diaphragm control slider passes the maximum proximity position between the permanent magnets and the Hall sensor.

During the stepwise movement of the diaphragm control slider by the controller to the first control end, it is desirable for the controller to move the diaphragm control slider in a stepwise manner towards the second control end for a predetermined number of steps. When the stepwise movement is completed, the controller determines whether a position of the diaphragm control slider is closer to one of the second control end and the first control end with respect to the maximum proximity position between the permanent magnets and the Hall sensor. In the case where the diaphragm control slider is determined as being positioned closer to the second control end, the controller moves the diaphragm control slider in a stepwise manner towards the first control end by progressively decelerating the stepwise movement speed from a fastest speed thereof. In the case where the diaphragm control slider is determined as being positioned closer to the first control end, the controller moves the diaphragm control slider in a stepwise manner towards the first control end at a slowest speed of the stepwise movement speed.

When the initialization-process command signal is inputted to the input device, it is desirable for the controller to drive the diaphragm control slider in a stepwise manner toward the second control end by a predetermined number of steps via the stepping motor when the diaphragm control slider is not positioned at the second control end.

It is desirable for the camera body to be provided with an alarm which notifies a processing error of the interchangeable lens camera. In the case where the origin cannot be detected even after a predetermined amount of time has lapsed from the time when the initialization-process command signal is inputted to the input device, the controller notifies, via the alarm, an initialization processing error.

In an embodiment, a diaphragm control apparatus of an interchangeable lens camera is provided, including a photographing lens provided with an adjustable diaphragm device, in which an aperture thereof is changeable between a maximum aperture and a minimum aperture; a camera body to which the photographing lens is detachably attached, the camera body being provided with a drive motor for driving the diaphragm device to change the aperture between the maximum aperture and the minimum aperture in a state in which the photographing lens is attached to the camera body; a diaphragm control slider which is provided in the camera body, wherein the diaphragm control slider moves by rotation of the drive motor between a first control end corresponding to the maximum aperture of the diaphragm device and a second control end corresponding to the minimum aperture of the diaphragm device; a diaphragm-control-slider biasing spring which is provided in the camera body, wherein the diaphragm-control-slider biasing spring biases the diaphragm control slider toward the first control end; an input device, into which an initialization-process command signal is inputted, wherein the initialization-process command signal commands an initialization process to commence in the camera body; and a controller, wherein, when the initialization-process command signal is inputted to the input device, the controller drives the diaphragm control slider in a stepwise manner to the first control end, which corresponds to the maximum aperture of the diaphragm device.

In an embodiment, a diaphragm control apparatus of an interchangeable lens camera is provided, including a photographing lens provided with an adjustable diaphragm device, in which an aperture thereof is changeable between a maximum aperture and a minimum aperture; a camera body to which the photographing lens is detachably attached, the camera body being provided with a drive motor for driving the diaphragm device to change the aperture between the maximum aperture and the minimum aperture in a state in which the photographing lens is attached to the camera body; a diaphragm control slider which is provided in the camera body, wherein the diaphragm control slider moves by rotation of the drive motor between a first control end corresponding to the maximum aperture of the diaphragm device and a second control end corresponding to the minimum aperture of the diaphragm device; a diaphragm-control-slider biasing spring which is provided in the camera body, wherein the diaphragm-control-slider biasing spring biases the diaphragm control slider toward the first control end; a diaphragm operatively-associated rod, provided in the photographing lens, which opens and shuts the diaphragm device between the maximum aperture and the minimum aperture by being rotated via the operatively associated movement of the diaphragm control slider provided in the camera body; and a diaphragm operatively-associated-rod biasing spring, provided in the photographing lens, which biases the diaphragm operatively-associated rod toward the minimum aperture of the diaphragm device. The biasing force of the diaphragm-control-slider biasing spring that is applied on the diaphragm control slider toward the first control end, which corresponds to the maximum aperture of the diaphragm device, is smaller than the biasing force of the diaphragm operatively-associated-rod biasing spring that is applied on the diaphragm operatively-associated rod toward the minimum aperture of the diaphragm device. In a state where the photographing lens is attached to the camera body, part of the biasing force of the diaphragm operatively-associated-rod biasing spring is cancelled out by the biasing force of the diaphragm-control-slider biasing spring, and the diaphragm device is positioned at an intermediately opened position between the maximum aperture and the minimum aperture.

According to the present invention, a diaphragm control apparatus of an interchangeable lens camera is achieved, in which, in an initialization process, the amount of rebound of the diaphragm control slider when the diaphragm control slider reaches the first movement extremity is suppressed, and the origin of the diaphragm control slider can be precisely determined in a short space of time.

The present disclosure relates to subject matter contained in Japanese Patent Application No. 2012-58688 (filed on Mar. 15, 2012) which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENTS

Embodiments of the present invention will be discussed in detail with reference to the attached drawings.

[Camera Body and Interchangeable Lens]

Figure 1:
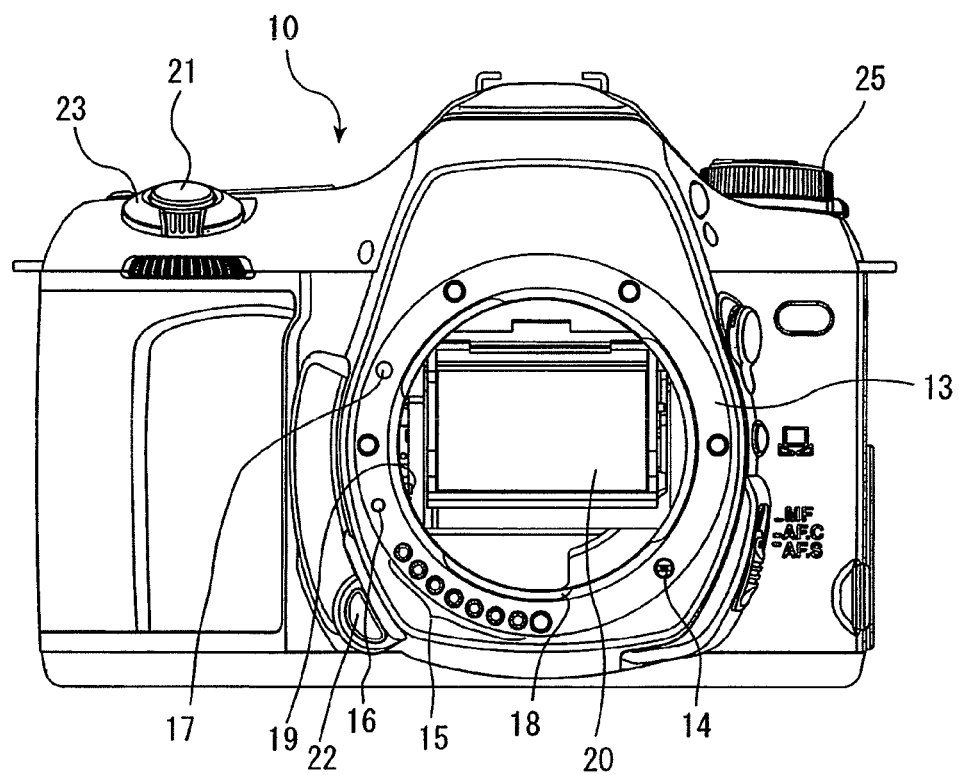
FIG. 1 is a front elevational view of a camera body of an SLR camera system, according to the present invention.
Figure 2:
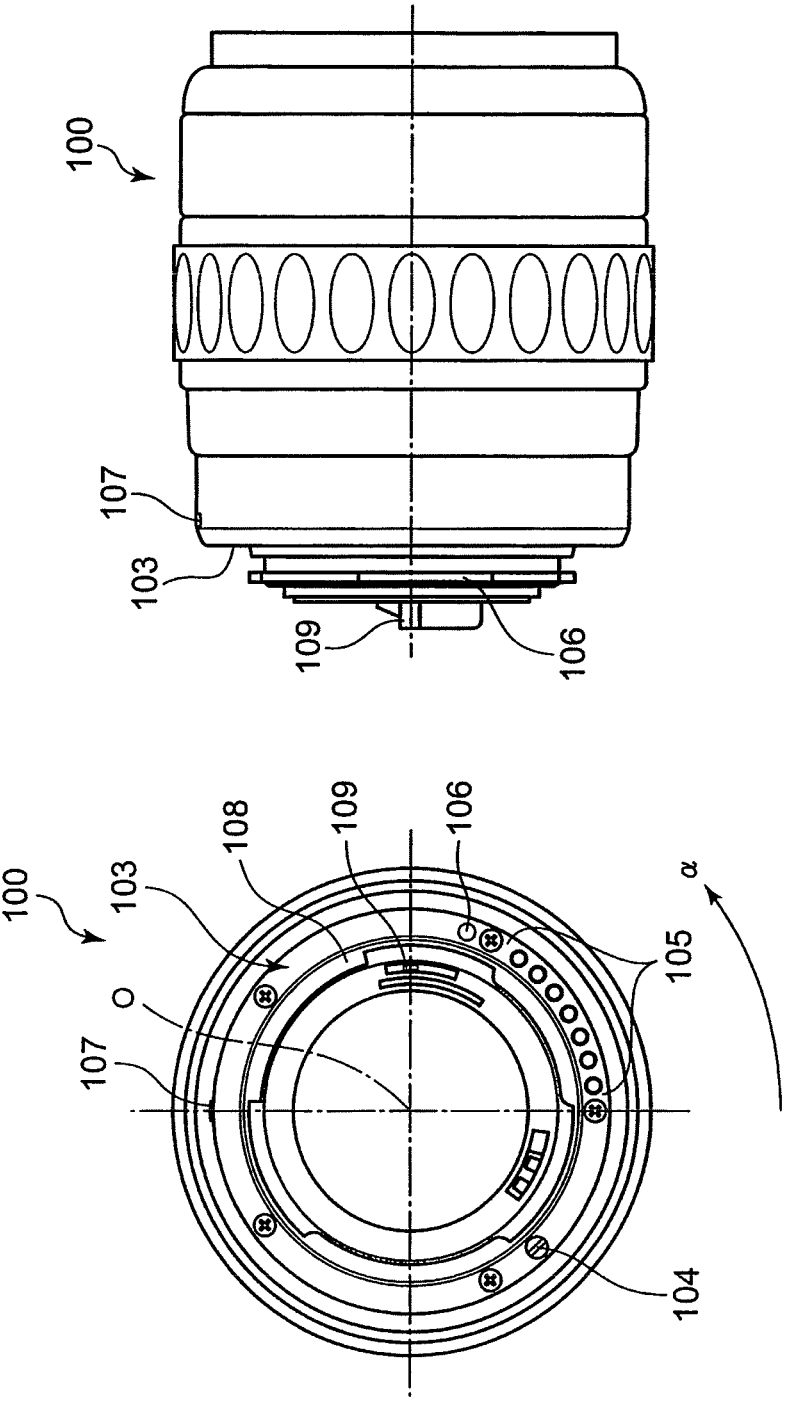
FIG. 2A is a rear elevational view of an interchangeable lens that is attachable to the camera body.
FIG. 2B is a side elevational view of the interchangeable lens shown in FIG. 2A.

FIG. 1 is a front elevational view of an embodiment of an SLR camera system according to the present invention. FIG. 2A (rear elevational view) and in FIG. 2B (side elevational view) show a camera body 10, to which an interchangeable lens (photographic lens) 100 is detachably attached.

As illustrated in FIG. 1, a body mount (mount ring) 13 is fixed to an approximate center of the front of the camera body 10. The camera body 10 is provided on the body mount 13 with an AF coupler 14, a group of information contacts 15, a lock pin (lock) 16 and a mount index mark 17. The camera body 10 is provided on an inner periphery of the body mount 13 with a bayonet mount 18. The camera body 10 is provided in a mirror box thereof with a main mirror 20, and is provided, on the left hand side of the main mirror 20 with respect to FIG. 1 in the vicinity of the bayonet mount 18, with a diaphragm control projection (diaphragm drive projection) 19 for controlling movements of a diaphragm operatively-associated rod (diaphragm operatively-associated) 109 of the interchangeable lens 100 (see FIGS. 2A and 2B). The body mount 13 is provided, on the circumferential surface thereof, with a lens lock release button 22. A detection switch (not shown) is provided for detecting whether or not the lens lock release button 22 has been pressed, and the detected signal is output to a CPU (input device/controller) 45 (also serving as an attachment determiner) of the camera body 10.

The camera body 10 is provided, on the top left thereof with respect to FIG. 1, with a shutter release button 21, and is provided around the shutter release button 21 with a rotary ring-shaped power switch 23. The camera body 10 is provided, on the top right thereof with respect to FIG. 1, with a mode dial 25.

The power switch 23 switches between a power ON position (energized state) and a power OFF position (non-energized state) of a power supply for a stepping motor (drive motor/driving source) 53. The power switch 23 is configured to be manually rotatable. The power switch 23 can be click-stopped at the power OFF position and at the power ON position, and can be turned to a live-view position (set on the opposite side of the power ON position from the power OFF position) against a spring biasing force. If the power switch 23 is further turned toward the live-view position from the power ON position, the live-view switch is turned ON while the power remains switched ON.

The mode dial 25 is a rotary switch, which stops with a tactile click at each of a plurality of different stop positions. Various exposure modes such as a still-image photographing mode and a movie-recording mode can be selected (switched) according to the click-stop position of the mode dial 25.

As illustrated in FIGS. 2A and 2B, the interchangeable lens 100 is provided at the rear end thereof with a lens mount ring 103. The interchangeable lens 100 is provided on the surface of the lens mount ring 103 with an AF coupler 104, a group of information contacts 105 and a lock hole (lock) 106 which correspond to the AF coupler 14, the group of information contacts 15 and the lock pin 16, respectively, that are provided on the surface of the body mount 13. The interchangeable lens 100 is provided on an inner periphery of the lens mount ring 103 with a bayonet mount 108. The interchangeable lens 100 is further provided immediately inside (radially inside) an inner peripheral surface of the bayonet mount 108 with the diaphragm operatively-associated rod 109 that is interconnected with the diaphragm control projection 19 of the camera body 10 when the interchangeable lens 100 is properly mounted onto the camera body 10. The interchangeable lens 100 is provided thereon with a mount index mark 107, which corresponds to the mount index mark 17 of the camera body 10.

When the interchangeable lens 100 is attached to the camera body 10, the bayonet mounts 18 and 108 are brought into engagement with each other with the mount index marks 17 and 107 aligned with each other, and subsequently the interchangeable lens 100 is rotated clockwise relative to the camera body 10 as viewed from front of the camera body 10 (i.e., in the direction of "α" in FIG. 2A). This clockwise rotation of the interchangeable lens 100 relative to the camera body 10 causes the lock pin 16 to be engaged in the lock hole 106 with a click at a locked position, whereby the interchangeable lens 100 stops rotating relative to the camera body 10 so that the interchangeable lens 10 becomes properly mounted onto the camera body 10. The diaphragm control projection 19 is formed on a diaphragm control slider 57 that is provided in the camera body 10. When the camera power source is OFF while the interchangeable lens 100 is positioned at the locked position, the diaphragm control slider 57, on which the diaphragm control projection 19 is formed, is positioned slightly below the upper extremity (the second control end) by the biasing force of a diaphragm-control-slider biasing spring 67, and the diaphragm operatively-associated rod 109 is not in contact with the diaphragm control projection 19. Thus, a clearance is formed between the diaphragm operatively-associated rod 109 and the diaphragm control projection 19. In a state where the interchangeable lens 100 is locked in this locked position, the AF coupler 104 is engaged with the AF coupler 14, and the group of information contacts 105 is in electrical contact with the group of information contacts 15.

Figure 3:
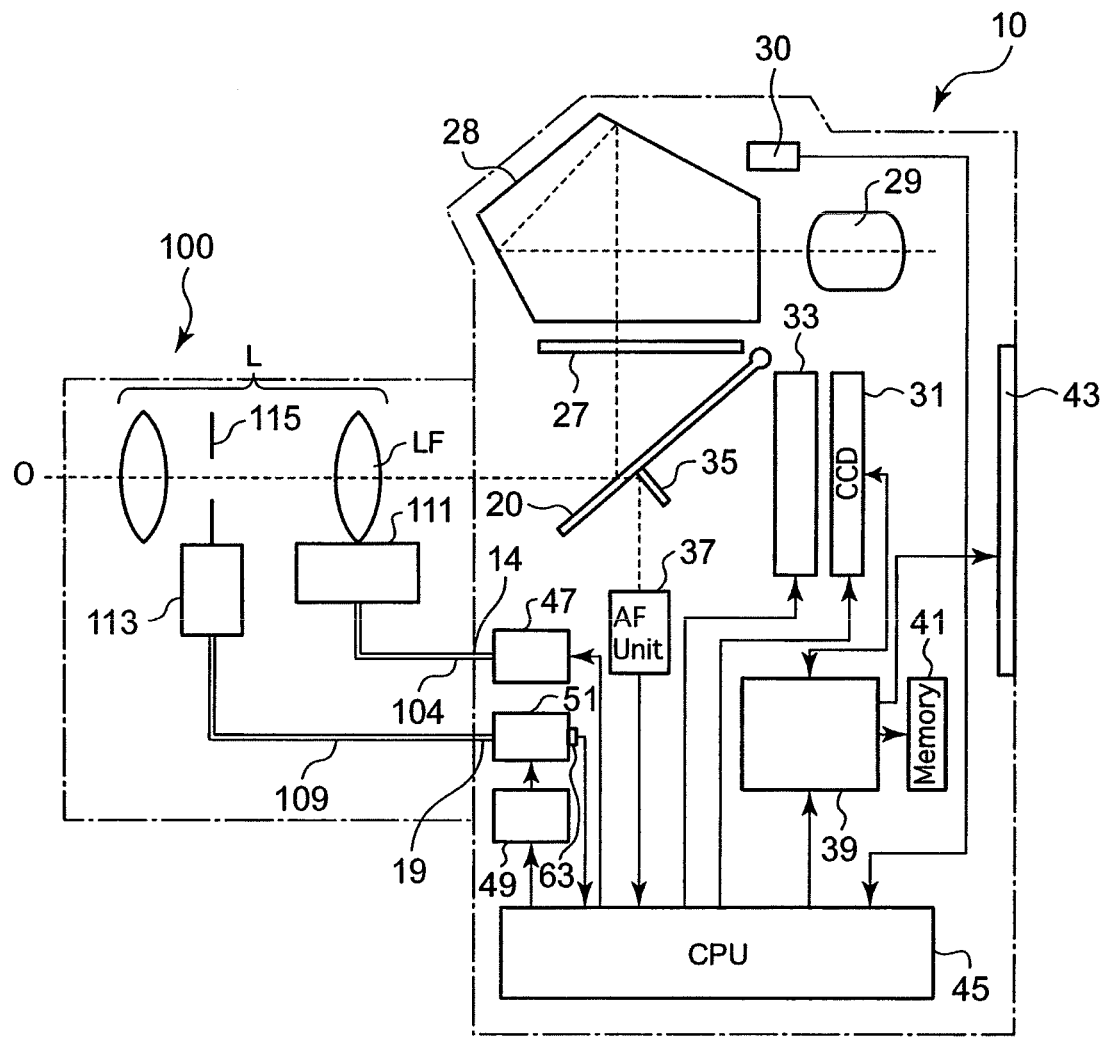
FIG. 3 is a block diagram showing main elements of the SLR camera system with the interchangeable lens attached to the camera body.

FIG. 3 is a schematic block diagram showing the main components of the camera body 10 and the interchangeable lens 100 that are attached to each other. The camera body 10 is provided above the main mirror 20 with a focusing screen 27, a pentagonal prism 28 and an eyepiece 29, which serve as elements of an optical viewfinder, through which an object image formed through the interchangeable lens 100 is viewed. The camera body 10 is provided in the vicinity of the eyepiece 29 with a photometering element 30 for measuring the object brightness.

The camera body 10 is provided behind the main mirror 20 with an image sensor (image pickup device) 31, such as a CCD image sensor which receives object light upon the main mirror 20 being raised to the retracted position (mirror-up position) to capture an object image, and is provided immediately in front of the image sensor 31 with a shutter mechanism 33. The camera body 10 is provided, immediately behind a half-mirror portion provided at a central portion of the main mirror 20, with a sub-mirror 35 that reflects incident object light downward. The camera body 10 is provided, below the sub-mirror 35 at the bottom of the mirror box, with an AF unit 37 that receives the object light reflected by the sub-mirror 35 to detect a focus state. The AF unit 37 is a so-called TTL phase-difference detector that outputs a pair of object image signals, which are obtained by pupil splitting, as AF data. The CPU (input device, controller) 45 provided in the camera body 10 calculates a defocus amount from this AF data, and also calculates data necessary for moving a focusing lens group LF of the interchangeable lens 100 attached to the camera body 10.

The camera body 10 is provided therein with a signal processor 39. The signal processor 39 processes image signals obtained by an image capturing operation of the image sensor 31, compresses or does not compress the processed image signals, and stores the image signals thus compressed or not compressed in an image memory 41 provided in the camera body 10. The camera body 10 is provided on the back thereof with a display 43 (e.g., an LCD panel) that displays captured images. The image displaying operation of the display 43 is controlled by the signal processor 39.

The camera body 10 is provided with an AF system 47 and a diaphragm control mechanism (diaphragm control apparatus) 51. The AF system 47 drives an AF mechanism 111 provided in the interchangeable lens 100, and the diaphragm control mechanism 51 controls the operation of a diaphragm device 113 provided in the interchangeable lens 100. The AF system 47 is provided with an AF motor (not shown) and transmits rotation of this AF motor to the AF mechanism 111 of the interchangeable lens 100 via the AF couplers 14 and 104. The operation of this AF motor is controlled by the CPU 45, and the AF mechanism 111 moves a focusing lens group LF of a photographing optical system L (see FIG. 3) of the interchangeable lens 100 to an in-focus position. The operation of the diaphragm control mechanism 51 is controlled by the CPU 45 via a diaphragm drive circuit 49 provided in the camera body 10 to drive the diaphragm control projection 19.

In addition, photometric data output from the photometering element 30 and AF data output from the AF unit 37 are input to the CPU 45. Based on such data (the photometric data and the AF data), the CPU 45 calculates appropriate data for the f-number and appropriate lens drive data for focusing, drives the diaphragm control mechanism 51 via the diaphragm drive circuit 49 in accordance with the calculated data on the f-number, and drives the AF system 47 in accordance with the calculated lens drive data. Furthermore, upon an ON/OFF operation of the power switch 23 for switching between power ON and power OFF states, the CPU 45 also receives these input signals as operational command signals. For example, upon an input operation being carried on the power switch 23 in order to switch the stepping motor 53 from a power OFF state to a power ON state (which is described hereinafter), the initialization-process command signal is input to the CPU 45. The CPU 45 controls the diaphragm control mechanism 51 via the diaphragm drive control circuit 49 based on these operational command signals (e.g., the initialization-process command signal) input from the power switch 23.

The camera body 10 is provided with an alarm system for notifying processing errors that occur in the camera. The processing errors include a finalizing processing error and an initialization processing error, which will be discussed in detail afterwards. The alarm system includes, although not limited thereto, for example, an error message on the display 43, an error beep from an audio generator (not shown), and a dust remover via vibration of the image sensor 31, etc. The dust remover can be an auxiliary function of an image stabilizer of the image sensor 31, in which dust that has stuck/attached to the image sensor 31 is shaken off by vibrating the image sensor 31. When vibration of the image sensor 31 is utilized as a dust remover, the image sensor is driven to the movable limit so that the generated impact can shake off the dust.

The attachment determiner (the CPU 45) determines whether or not the interchangeable lens 100 is attached to the camera body 10.

Specifically, when the interchangeable lens 100 is attached to the camera body 10, the bayonet mounts 18 and 108 are brought into engagement with each other with the mount index marks 17 and 107 aligned with each other, and subsequently the interchangeable lens 100 is rotated clockwise relative to the camera body 10 as viewed from the front of the camera body 10 (i.e., in the direction of "α" in FIG. 2A). This clockwise rotation of the interchangeable lens 100 relative to the camera body 10 causes the lock pin 16 to be engaged in the lock hole 106 with a click at a locked position, whereby the interchangeable lens 100 stops rotating relative to the camera body 10 so that the interchangeable lens 100 becomes properly mounted onto the camera body 10. On the other hand, when the interchangeable lens 100 is detached from the lens body 10, the lens lock release button 22 (see FIG. 1) is manually depressed, and the interchangeable lens 100 is rotated counterclockwise relative to the camera body 10 as viewed from the front of the camera body 10 (i.e., the direction opposite to "α" in FIG. 2A). The counterclockwise rotation of the interchangeable lens 100 relative to the camera body 10 releases the locking state of lock pin 16 from the lock hole 106, whereby the engagement of the bayonet mounts 18 and 108 are also released. According to the present embodiment, the attachment determiner (in combination with the CPU 45) determines that the interchangeable lens 100 is detached from the camera body 10 when the following two conditions are both satisfied: the bayonet mounts 18 and 108 have been released from engagement and the interchangeable lens 100 is detached from the camera body 10 (which means that lens communication is not established); and the lens lock release button 22 is not depressed. Therefore, even when the engagement of the bayonet mounts 18 and 108 are released and the interchangeable lens 100 is detached from the camera body 10, as long as the lens release button 22 is pressed, the attachment determiner (in combination with the CPU 45) determines that the interchangeable lens 100 is still attached to the camera body 10. Accordingly, the finalization process is prevented from being mistakenly or carelessly performed, of which details will be discussed afterwards. The structure and determining process that is performed by the CPU 45 in combination with the attachment determiner are only an example of the present invention; the present invention is not limited thereto.

In a power ON state with the interchangeable lens 100 removed from the camera body 10 and the stepping motor 53 in an energized state, if the attachment determiner (the CPU 45) thereafter determines that the interchangeable lens 100 has been mounted to the camera body 10 (upon the interchangeable lens 100 again being mounted to the camera body 10), the initialization-process command signal is input to the CPU 45. The CPU 45 controls the diaphragm control mechanism 51 via the diaphragm drive circuit 49 based on the inputted initialization-process command signal.

[Diaphragm Control Mechanism and Diaphragm Device]

Figure 4:
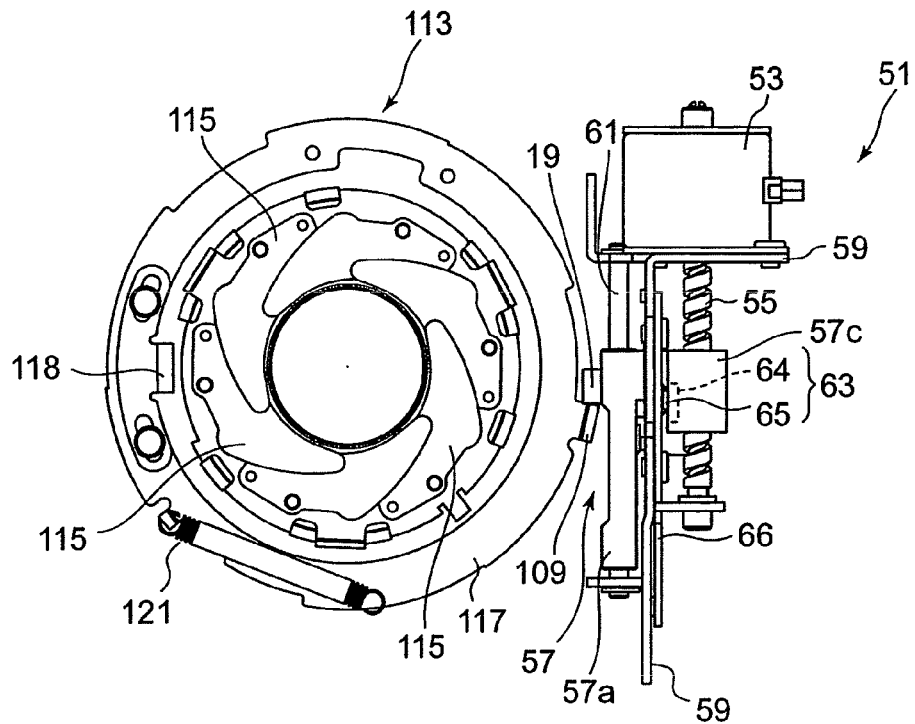
FIG. 4 is a rear elevational view of a diaphragm control mechanism provided in the camera body, and main elements of a diaphragm device provided in the interchangeable lens, showing the diaphragm control mechanism and the diaphragm device in a full-aperture state.
Figure 5:
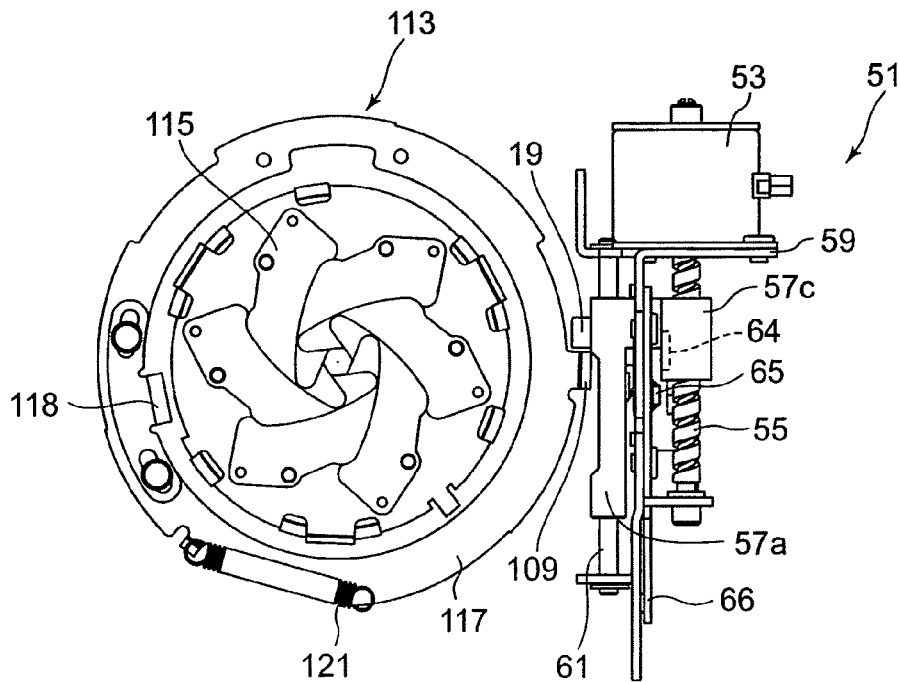
FIG. 5 is a view similar to that of FIG. 4, showing the diaphragm control mechanism and the diaphragm device in a fully stopped-down state.
Figure 6A:
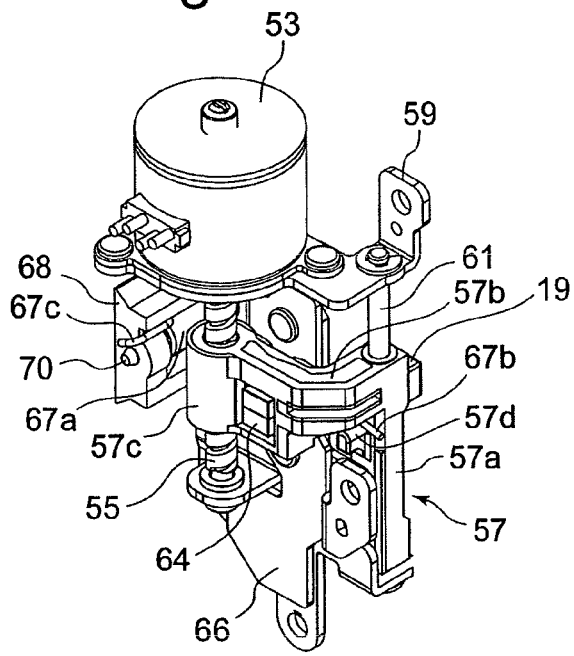
FIGS. 6A and 6B are perspective views of the diaphragm control mechanism of the camera body with the diaphragm device in an open-aperture state, viewed obliquely from the front left-hand side and the front right-hand side, respectively.
Figure 6B:
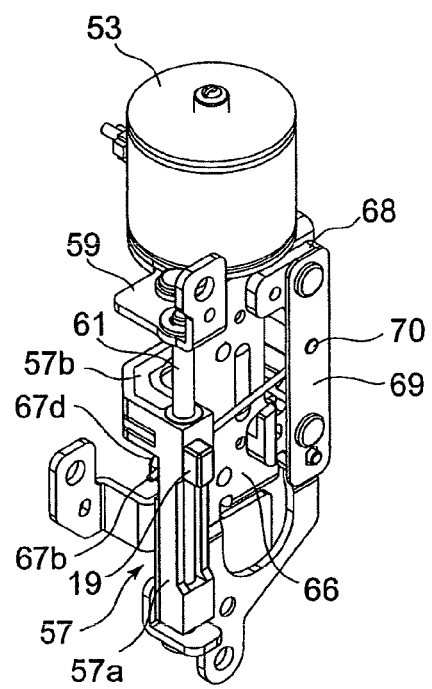
Figure 7A:
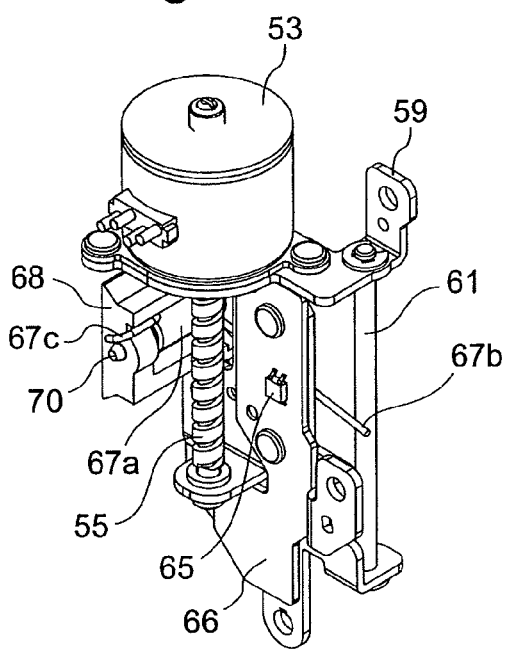
FIGS. 7A and 7B are perspective views of the diaphragm control mechanism of FIGS. 6A and 6B, with a diaphragm control slider removed for clarity, viewed obliquely from the front left-hand side and the front right-hand side, respectively.
Figure 7B:
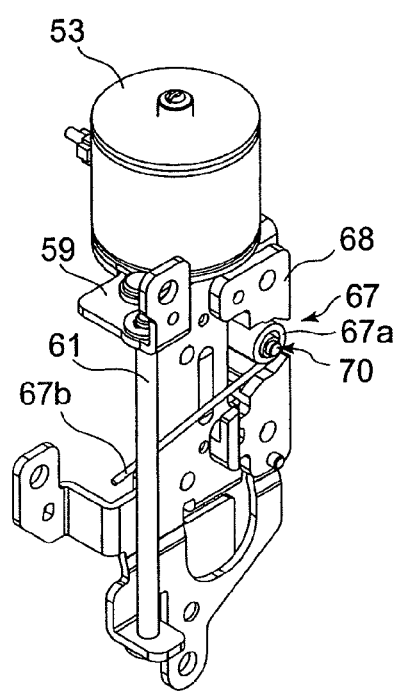
Figure 8:
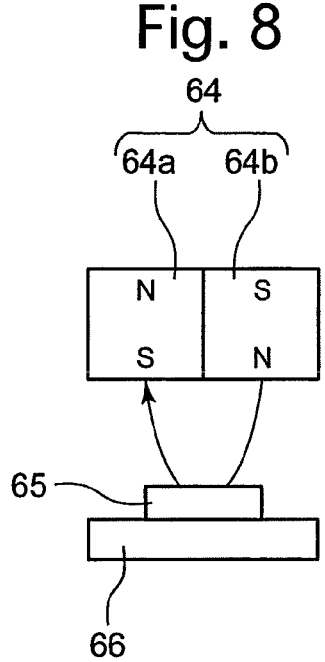
FIG. 8 is a schematic side view of an embodiment of a position detector, composed of a Hall sensor and a pair of magnets, incorporated in the diaphragm control mechanism.

The structures of the diaphragm control mechanism 51 of the camera body 10 and the diaphragm device 113 of the interchangeable lens 100 will be discussed in detail with reference to FIGS. 4 through 8. FIG. 4 is a rear elevational view of the diaphragm control mechanism 51 and main elements of the diaphragm device 113 in a full-aperture state; FIG. 5 is a rear elevational view of the diaphragm control mechanism 51 and main elements of the diaphragm device 113 in a fully stopped-down state; FIGS. 6A and 6B are perspective views of the diaphragm control mechanism 51 with the diaphragm device 113 in an open-aperture state, viewed obliquely from the front left-hand side and the front right-hand side, respectively; FIGS. 7A and 7B are perspective views of the diaphragm control mechanism 51 shown in FIGS. 6A and 6B, with the diaphragm control slider 57 removed for clarity, viewed obliquely from the front left-hand side and the front right-hand side, respectively; and FIG. 8 is a schematic diagram showing an embodiment of a position detector (composed of a Hall sensor and a pair of permanent magnets) for detecting the origin of the diaphragm control slider 57.

The diaphragm control mechanism 51 is provided with a stepping motor 53, as a driving source thereof, which has a lead screw 55 as a rotary shaft. Namely, the lead screw 55 rotates integrally with the rotor of the stepping motor 53. The stepping motor 53 is fixed to a frame (stationary member) 59, and the end (lower extremity with respect to FIGS. 4 through 7B) of the lead screw 55 is supported by a lug, projecting from the frame 59, so that the lead screw 55 is rotatable about the axis thereof. The frame 59 is fixed to a stationary frame (not shown) of the camera body 10.

A screw nut 57c formed at an end of an arm 57b extending from the diaphragm control slider 57 is screw-engaged with the lead screw 55. The diaphragm control slider 57 is provided, in a main body 57a thereof, with a shaft hole in which a slide shaft 61 is slidably fitted, so that the diaphragm control slider 57 is supported by the slide shaft 61 to be slidable thereon. Both ends of the slide shaft 61 are supported by the frame 59 (an upper portion of the frame 59 and a lower lug projecting from the frame 59) so that the slide shaft 61 extends parallel to the lead screw 55. The diaphragm control projection 19 is formed to project integrally from the main body 57a of the diaphragm control slider 57, thus moving integrally with the diaphragm control slider 57.

The diaphragm control mechanism 51 can drive the stepping motor 53 stepwise to rotate the lead screw 55 stepwise. Namely, the diaphragm control mechanism 51 can integrally move the diaphragm control slider 57 and the diaphragm control projection 19, together with the screw nut 57c, stepwise by very small length units determined by a single-step rotational angle (rotational angle by one excitation step) and the lead of the lead screw 55. The moving range of diaphragm control slider 57 in the present embodiment ranges from the movement extremity thereof (one end of the moving range thereof on the open-aperture side of an initial position/open-aperture-side movable limit), shown in FIG. 4, at which one end of the diaphragm control slider 57 (in the sliding direction thereof) comes in contact with a limit portion of the frame 59, to the other end of the moving range on the fully stopped-down side (stop-down-side movable limit), at which the other end of the diaphragm control slider 57 (in the sliding direction thereof) comes in contact with the other limit portion of the frame 59. According to the present embodiment, the open-aperture movable limit is referred to as "the lower extremity (the first control end)". In addition, the present embodiment also refers the positions in the vicinity of these movable limits, yet not reaching these movable limits, as "the lower extremity (the first control end)" and "the upper extremity (the second control end)". More specifically, the position in the vicinity of the open-aperture movable limit, at which the diaphragm control slider 57 is not in contact with the limit portion of the frame 59, is also included in "the lower extremity (the first control end)". Similarly, the position in the vicinity of the stop-down movable limit, at which the diaphragm control slider 57 is not in contact with the other limit portion of the frame 59, is also referred as "the upper extremity (the second control end)". In other words, both the terms "the lower extremity (the first control end)" and "the upper extremity (the second control end)" should be interpreted in a wider sense that includes the mechanical ends at which the diaphragm control slider 57 comes in contact with the limit portions of the frame 59, and also includes the areas in the vicinity of such mechanical ends in which the diaphragm control slider 57 is not in contact with the limit portions of the frame 59. FIG. 5 shows the fully stopped-down position of the interchangeable lens 100, which means that the diaphragm control slider 57 is positioned at the upper extremity (the second control end). It is clear from FIG. 5 that, when the diaphragm control slider 57 is positioned at the upper extremity (the second control end), one end of the diaphragm control slider 57 (in the upward moving direction) is not in contact with the limit portion of the frame 59 on the stop-down side of the interchangeable lens 100. FIG. 4 shows the full-aperture state of the interchangeable lens 100, in which a diaphragm ring 117 of the interchangeable lens 100 is positioned at the full-aperture position of the diaphragm device 113, and FIG. 5 shows the fully stopped-down state of the interchangeable lens 100 in which the diaphragm ring 117 of the interchangeable lens 100 is positioned at the stop-down position of the diaphragm device 113. The diaphragm control slider 57 can move further downward from the position shown in FIG. 4 by a certain amount (distance) toward the mechanical end of the lower extremity (the first control end). Similarly, the diaphragm control slider 57 can further move upward from the position shown in FIG. 5 by a certain amount (distance) toward the mechanical end of the upper extremity (the second control end).

The stepping motor 53 in the present embodiment is a two-phase stepping motor which includes two-phase coils X and X−, and coils Y and Y−, and rotates stepwise using four kinds of excitation patterns. Table 1 below shows the numbers (identification numbers) of these four kinds of excitation patterns (NO.) for the coils X, X−, Y and Y−. In this embodiment, by repeating the two-phase driving excitation patterns (0), (1), (2), (3) (i.e., by switching energization of the coils X, X−, Y and Y−), the stepping motor 53 can be driven stepwise in one direction (diaphragm stop-down direction). In addition, the stepping motor 53 can be driven stepwise in the other (opposite) direction (diaphragm opening direction) by repeating the excitation patterns (3), (2), (1), (0).

TABLE 1

|   | NO. | | | |
|---|-----|-----|-----|-----|
|   | (0) | (1) | (2) | (3) |
| X  | 0 | 0 | 1 | 1 |
| X− | 1 | 1 | 0 | 0 |
| Y  | 0 | 1 | 1 | 0 |
| Y− | 1 | 0 | 0 | 1 |

1: Energized
0: Not energized

When the stepping motor 53 is excited with one of the four excitation patterns (NO.), and thereupon the excitation is cut off to hold (stop) the stepping motor 53, the first excitation (NO.) for the subsequent driving of the stepping motor 53 is one before or after the excitation pattern, in accordance with the driving direction of the stepping motor 53, at the time of the excitation cutoff. For instance, if the number of the excitation pattern (NO.) at the time of an excitation cutoff (at the time the stepping motor 53 is in a free state) is 0 (when the detent position is (0)), the subsequent excitation starts from the excitation pattern (1) in the case of driving the stepping motor 53 in the diaphragm stop-down direction, or starts from the excitation pattern (3) in the case of driving the stepping motor 53 in the diaphragm opening direction. Such an excitation operation is carried out by the diaphragm control circuit 49 under the control of the CPU 45. In the present embodiment, the excitation patterns are switched at a constant pulse rate. Namely, the excitation patterns are switched from one excitation pattern to another after a continuation of energization (excitation) with each excitation pattern (NO.) for a fixed period of time t1 (several microseconds (ms)). If the time t1 becomes shorter, the stepping motor 53 will drive step rotation at a higher speed, and if the time t1 becomes longer, the stepping motor 53 will drive step rotation at a lower speed.

As shown in FIGS. 6A through 7B, the diaphragm control mechanism 51 is also provided with the diaphragm-control-slider biasing spring 67 which biases the diaphragm control slider 57 toward the lower extremity (first control end). The diaphragm-control-slider biasing spring 67 is a torsion spring provided with a coil portion 67a at the intermediate portion thereof. The coil portion 67a of the diaphragm-control-slider biasing spring 67 is fitted over a slide-seat pin 70 which is provided on a slide seat 68 and projects therefrom. The slide seat 68 is fixed to the frame 59 via a slide-seat plate 69. Furthermore, the diaphragm-control-slider biasing spring 67 constantly biases the diaphragm control slider 57 toward the lower extremity (first control end) with one end portion 67b that extends from the coil portion 67a engaged with an engagement portion 57d that projects from the diaphragm control slider 57, and with the other end portion 67c engaged with the slide seat 68. The biasing force of the diaphragm-control-slider biasing spring 67 is set to be within a range that allows the stepping motor 53 to drive (move), in a stepwise manner, the diaphragm control slider 57 toward the upper extremity (second control end).

As illustrated in FIGS. 4 and 5, the diaphragm device 113 of the interchangeable lens 100 operates to adjust the amount of light passing through a diaphragm aperture formed by a plurality of diaphragm blades (aperture blades) 115 (e.g., six blades in the illustrated embodiment) by opening and shutting the plurality of diaphragm blades 115 between the maximum aperture as shown in FIG. 4 and the minimum aperture as shown in FIG. 5. The diaphragm device 113 of the interchangeable lens 100 is provided with the diaphragm ring 117, the diaphragm operatively-associated rod 109 and a linkage rod 118. The diaphragm ring 117 rotates about an optical axis O of the interchangeable lens 100. The diaphragm operatively-associated rod 109 of the diaphragm device 113, which is engageable with the diaphragm control projection 19 of the diaphragm control slider 57, projects rearwardly (toward the camera body 10) from an outer edge of the diaphragm ring 117. The linkage rod 118 projects from the inner edge of the diaphragm ring 117 toward the object side to extend parallel to the optical axis O. The diaphragm device 113 (diaphragm blades 115) is controlled to open and shut between the maximum aperture and the minimum aperture by being rotated via the operatively associated movement of the diaphragm operatively-associated rod 109 with the diaphragm control projection 19 of the diaphragm control slider 57. In addition, the diaphragm device 113 is provided with a diaphragm operatively-associated-rod biasing spring 121. The diaphragm ring 117 (diaphragm operatively-associated rod 109) is biased to rotate in a direction to stop down the diaphragm device 113 (diaphragm blades 115) to the minimum aperture (i.e., in the counterclockwise direction of FIGS. 4 and 5) by the diaphragm operatively-associated-rod biasing spring 121. The biasing force of the diaphragm control slider 57 via the diaphragm-control-slider biasing spring 67 is set smaller than the biasing force of the diaphragm operatively-associated rod 109 via the diaphragm operatively-associated-rod biasing spring 121.

Accordingly, in a state where the photographing lens 100 is attached to the camera body 10, part of the biasing force of the diaphragm operatively-associated-rod biasing spring 121 is cancelled out by the biasing force of the diaphragm-control-slider biasing spring 67 and the diaphragm device 113 is positioned at an intermediately opened position between the maximum aperture and the minimum aperture. Accordingly, compared to the case where the diaphragm device 113 is positioned at the maximum aperture position (fully-opened state), the amount of sunlight entering into the camera body 10 from the diaphragm device 113 can be reduced and damage (such as burning out of the image sensor 31 or melting of components made from resin) to any components in the camera body 10 can be prevented. This functional effect is particularly significant when the present invention is applied to a mirrorless interchangeable lens camera having no split mirror for an optical viewfinder; this is because, in general, since the mirrorless interchangeable lens camera has no split mirror for optical viewfinder, there is a greater risk of sunlight entering into the camera body from the opening of the diaphragm mechanism of the photographing lens, which would then damage the dark box of the camera body or other camera components/parts (such as burning out of image sensor or melting of the shutter mechanism).

With the above described structure, when the interchangeable lens 100 is attached to the camera body 10 and the diaphragm control slider 57 is positioned at the upper extremity (the second control end) including both the mechanical end and the vicinity area thereof as shown in FIG. 5, the diaphragm operatively-associated rod 109 does not move (operate) in association (in other words, is not in contact) with the diaphragm control projection 19 of the diaphragm control slider 57, and there is a clearance between the diaphragm operatively-associated rod 109 and the diaphragm control projection 19 by an amount (distance) such that the diaphragm device 113 can maintain the minimum aperture of the diaphragm blades 115. From this state, the stepping motor 53 rotates (drives) in a stepwise manner to cause the diaphragm control slider 57 to move downward, and subsequently the diaphragm control slider 57 (diaphragm control projection 19) comes in contact with the diaphragm operatively-associated rod 109 so that the diaphragm operatively-associated rod 109 moves in operative association with the downward movement of the diaphragm control slider 57. Subsequently, the diaphragm control projection 19 of the diaphragm control slider 57 rotates the diaphragm operatively-associated rod 109 (and also the diaphragm ring 117) in the clockwise direction with respect to FIG. 5, whereby the aperture of the diaphragm device 113 becomes larger. When the diaphragm control slider 57 reaches the lower extremity (the first control end, including both the mechanical end and the vicinity area thereof) by the stepwise rotation of the stepping motor 53, further rotation of the diaphragm operatively-associated rod 109 (together with the diaphragm ring 117) in the clockwise direction is prohibited as shown in FIG. 4. This state indicates the maximum aperture of the diaphragm device 113. On the other hand, when the diaphragm control slider 57 moves upward by the stepwise rotation of the stepping motor 53, the diaphragm operatively-associated-rod biasing spring 121 biases the diaphragm operatively-associated rod 109 (together with the diaphragm ring 117) to rotate in the counterclockwise direction with respect to FIG. 4, whereby the aperture of the diaphragm device 113 becomes smaller.

The diaphragm control mechanism 51 is provided with a pair of magnets 64 (64a and 64b) and a Hall sensor 65 (see FIG. 8) that serve as elements of an origin detection sensor (position detector) 63 for detecting the origin of the diaphragm control slider 57. The magnets 64a and 64b are fixed to the arm 57b of the diaphragm control slider 57, which is provided between the lead screw 55 and the slide shaft 61, and the Hall sensor 65 is mounted on a sensor board 66 that is fixed to the frame 59. If the origin detection sensor 63 uses a Hall element having an auto-compensation function, the influence and errors caused by environmental conditions and secular changes can be minimized.

The Hall sensor 65 senses a magnetic force from the magnets 64 (64a and 64b) and outputs a voltage according to this magnetic force. The CPU 45 detects the position of the magnets 64a and 64b, i.e., a detection signal (A/D value) corresponding to the position of the diaphragm control slider 57, by A/D conversion (by amplifier) of the output voltage of the Hall sensor 65. The term "detection signal from the Hall sensor 65" indicates "the A/D value of the voltage detected by the Hall sensor 65 obtained via A/D conversion". Since the Hall sensor 65 outputs a detection signal according to the distance from the Hall sensor 65 to the pair of magnets 64a and 64b, the relative distance between the Hall sensor 65 and the pair of magnets 64a and 64b can be detected within a predetermined range. The magnets 64a and 64b and the Hall sensor 65 are arranged so as to output the largest detection signal when the magnets 64a and 64b of the diaphragm control slider 57 are positioned at the position closest to the Hall sensor 65, and to output the smallest detection signal when the diaphragm control slider 57 is positioned at the lower extremity. Furthermore, the Hall sensor 65 does not output any detection signal when the diaphragm control slider 57 is positioned at the upper extremity (both the mechanical end and the vicinity area thereof).

FIG. 8 schematically shows the structure of an embodiment of the origin detection sensor 63 of the diaphragm control mechanism 51. In this drawing, the leftward/rightward direction corresponds to the moving direction of the pair of magnets 64a and 64b.

In the embodiment shown in FIG. 8, the two magnets 64a and 64b are joined together and arranged along the moving direction thereof so that opposite poles of the two magnets 64a and 64b face the Hall sensor 65. According to this structure, a magnetic force of the two magnets 64a and 64b exits out of the center of the surface of the N-pole of the magnet 64b which faces the Hall sensor 65 and enters into the center of the surface of the S-pole of the magnet 64a which faces the Hall sensor 65, as shown in FIG. 8; accordingly, the magnetic force changes abruptly in the relative moving direction (horizontal direction as viewed in FIG. 8), thus enabling an acute sensitivity of the origin detection sensor 63. It is possible for a single ferromagnetic material to be divided into two and for each ferromagnetic material thereof to be magnetized in a direction orthogonal to the relative moving direction.

First Aspect of Embodiment

Figure 9:
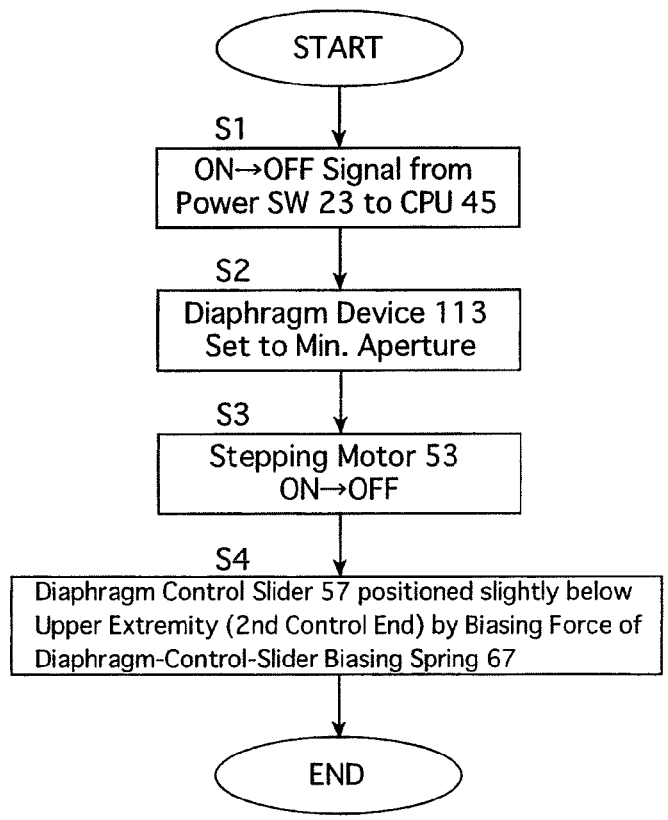
FIG. 9 is a flow chart showing the overall operation of the diaphragm control mechanism in which the power switch is operated from a power ON state to a power OFF state (finalization process)

The first aspect of the present embodiment will now be discussed with reference to the flow chart of FIG. 9, showing the overall operation of the diaphragm control mechanism 113, in which the power switch 23 is operated to switch from the power ON state to the power OFF (finalization process) with the interchangeable lens 100 attached (properly mounted) to the camera body 10.

When the power switch 23 is operated to switch from the power ON state to the power OFF state, a corresponding command signal is sent to the CPU 45 (step S1). Upon input of the command signal, the CPU 45 firstly activates, via the diaphragm drive control circuit 49, the stepping motor 53 to rotate (drive) the diaphragm control mechanism 51 in a stepwise manner, whereby the diaphragm control slider 57 moves to the upper extremity (the second control end). The upward movement of the diaphragm control slider 57 causes the diaphragm operatively-associated rod 109 to rotate in the counterclockwise direction with respect to FIG. 4 by the biasing force of the diaphragm operatively-associated-rod biasing spring 121, whereby the aperture of the diaphragm device 113 becomes smaller until reaching the minimum aperture as shown in FIG. 5 (step S2). When the aperture of the diaphragm device 113 reaches the minimum aperture as shown in FIG. 5, the CPU 45 switches, via the diaphragm drive control circuit 49, the stepping motor 53 of the diaphragm control mechanism 51 from the power ON state to the power OFF state, namely, from an energized state to a non-energized state (step S3). In the power OFF state of the stepping motor 53, the diaphragm control slider 57 is positioned slightly below the upper extremity (the second control end) by the biasing force of the diaphragm-control-slider biasing spring 67 (step S4). At this position (of the diaphragm control slider 57) slightly below the upper extremity, the diaphragm device 113 is maintained at the minimum aperture if the diaphragm control projection 19 is not in contact (not operatively associated) with the diaphragm operatively-associated rod 109, and the diaphragm device 113 is maintained at a slightly opened state from the minimum aperture if diaphragm control projection 19 is in contact (operatively associated) with the diaphragm operatively-associated rod 109.

When the CPU 45 determines that the diaphragm device 113 fails to reach the minimum aperture of the diaphragm blades 115 after a predetermined amount of time has passed from the operation of the power switch 23 (from ON to OFF), the input signal of the power switch 23 is not accepted, and instead the finalization processing error is notified by the alarm system.

As discussed above, when the CPU 45 receives the command signal of the power switch 23 to switch the stepping motor (driving source) 53 from the power ON state to the power OFF state (i.e., from the energized state to the non-energized state), the CPU 45 firstly minimizes the aperture of the diaphragm device 113 via the stepping motor 53, and subsequently switches the stepping motor 53 from the power ON state to the power OFF state (i.e., from the energized state to the non-energized state). Accordingly, the components/parts provided inside the camera body 10 can be protected from any potential damage such as the image sensor 31 being burnt out or any component/parts formed from a resin material being melted, by preventing sunlight from entering into the camera body 10 via the diaphragm device 113 of the interchangeable lens 100.

Second Aspect of Embodiment

The second aspect of the present embodiment will now be discussed with reference to the flow chart of FIG. 10 and the timing chart of FIG. 11. According to the first aspect of the present embodiment as discussed above, in the case where the diaphragm control slider 57 is positioned slightly below the upper extremity (the second control end), the power switch 23 is operated to switch the stepping motor (driving source) 53 from the power OFF state to the power ON state (i.e., from a non-energized state to energized state). The stepping motor 53 is rotated stepwise to move the diaphragm control slider 57 towards the lower extremity (the first control end), which corresponds to the maximum aperture of the diaphragm device 113, whereby the origin is detected. This is the second aspect of the present embodiment, which is referred to as "the first initialization process".

When the power switch 23 is operated from the power OFF state to the power ON state, the initialization-process command signal is input into the CPU (input device, controller) 45 (step S1). In this state, the diaphragm control slider 57 is positioned slightly below the upper extremity (second control end) by the diaphragm-control-slider biasing spring 67, and the Hall sensor 65 does not output any detection signal (0-output), as shown in FIG. 11.

Upon input of the command signal from the power switch 23, the CPU 45 activates the stepping motor 53 to move the diaphragm control slider 57 upward in a stepwise manner. Each step is 3 ms, and the diaphragm control slider 57 moves 8 steps (energized for 3 ms×8 times) in order to determine the current position of the diaphragm control slider 57 (step S2). Accordingly, the diaphragm control slider 57 is driven (moved) in a stepwise manner to the upper extremity (second control end) against the biasing force of the diaphragm-control-slider biasing spring 67.

Thereafter, the CPU 45 activates the stepping motor 53 to make downward stepwise movement of the diaphragm control slider 57 by two steps at 2 ms/step (energized for 2 ms×2 times) (step S3). The CPU 45 further activates the stepping motor 53 to move the diaphragm control slider 57 downward in a stepwise manner at steps S4 and S5. Namely, the CPU 45 activates the stepping motor 53 to move the diaphragm control slider 57 by two steps at 1.2 ms/step (energized for 1.2 ms×2 times) at step S4, and to move the diaphragm control slider 57 by repeated steps of 0.9 ms (energized for 0.9 ms) at step S5. Accordingly, the CPU 45 gradually increases the downward stepwise movement speed of the diaphragm control slider 57. As illustrated in FIG. 11, in accordance with the downward movement of the diaphragm control slider 57, the distance between the Hall sensor 65 and the pair of permanent magnets 64 (64a, 64b) becomes in the range within a set value, whereby the Hall sensor 65 begins to input the detection signal into the CPU 45. When the diaphragm control slider 57 moves further downward, the position of the permanent magnets 64 (64a, 64b) becomes the closest to the Hall sensor 65, whereby the detection signal of the Hall sensor 65 inputted into the CPU 45 reaches the maximum value (peak value).

Every time the CPU 45 activates the stepping motor 53 to move the diaphragm control slider 57 downward by 0.9 ms per step (i.e., every time the CPU 45 energizes the stepping motor 53 at 0.9 ms/step), the CPU 45 compares the present detection signal (A/D value) with the previous detection signal (A/D value), respectively sent from the Hall sensor 65. When the difference obtained by deducting the present detection signal (A/D value) from the previous detection signal (A/D value) is greater than or equal to a predetermined value (for example 11A/D) three times, the CPU 45 determines that the detection signal from the Hall sensor 65 has passed the maximum (peak) value and has shifted to the downward curve (YES at step S6). Accordingly, the CPU 45 activates the stepping motor 53 to move the diaphragm control slider 57 downward by two steps at 1.2 ms/step (energized for 1.2 ms×2 times) (step S7). Thereafter, the CPU 45 further activates the stepping motor 53 to move the diaphragm control slider 57 downward by two steps at 2 ms/step (energized for 2 ms×2 times) at step S8, and moves the diaphragm control slider 57 downward by repeated steps of 3 ms (energized for 3 ms) at step S9. Accordingly, the CPU 45 gradually decreases the downward stepwise movement speed of the diaphragm control slider 57. This progressive deceleration of the diaphragm control slider 57 eases any potential impact on the diaphragm control slider 57 when bouncing (rebounding) at the lower extremity.

Figure 11:
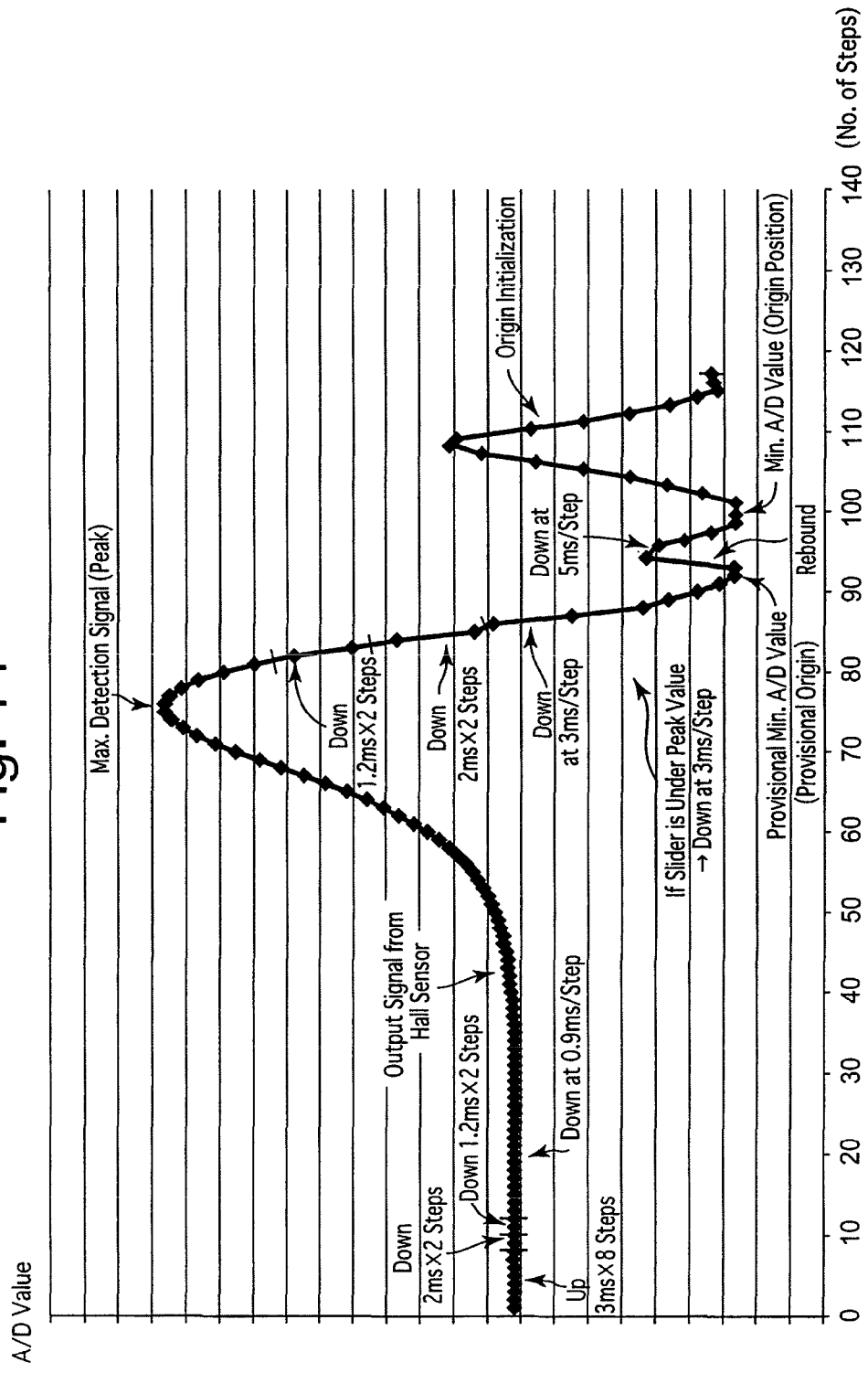
FIG. 11 is a timing chart showing detection signal of the Hall sensor that occurs with the initialization process (first initialization process)

When the diaphragm control slider 57 moves downward to the lower extremity (the first control end) and impacts one limit portion of the frame 59, the diaphragm control slider 57 bounces (rebounds) at the lower extremity and moves upward as shown in FIG. 11. Every time the CPU 45 activates the stepping motor 53 move the diaphragm control slider 57 downward for 3 ms (i.e., every time the CPU 45 energizes the stepping motor 53 at 3 ms/step), the CPU 45 compares the present detection signal (A/D value) with the previous detection signal (A/D value), respectively sent from the Hall sensor 65. When the difference obtained by deducting the previous detection signal (A/D value) from the present detection signal (A/D value) becomes greater than or equal to a predetermined value (for example 4A/D), the CPU 45 determines that the diaphragm control slider 57 has bounced (rebounded) at the lower extremity (YES at step S10). Upon determining that the diaphragm control slider 57 has bounced (rebounded) at the lower extremity, the CPU 45 stores in a memory (not shown) the previous determination signal (A/D value) obtained from the Hall sensor 65 as the "temporary minimum A/D value" (step S11). The position of the diaphragm control slider 57 corresponding to this "temporary minimum A/D value" serves as the "temporary origin" of the diaphragm control slider 57.

After the CPU 45 has determined that the diaphragm control slider 57 has bounced (rebounded) at the lower extremity, the CPU 45 activates the stepping motor 53 to move the diaphragm control slider 57 downward in a stepwise manner repeatedly for 5 ms (repeatedly energized for 5 ms) (step S12). Every time the CPU 45 activates the stepping motor 53 to move the diaphragm control slider 57 in a stepwise manner repeatedly for 5 ms (i.e., every time the CPU 45 energizes the stepping motor 53 repeatedly for 5 ms/step), the CPU 45 compares the present detection signal (A/D value) with the "temporary minimum A/D value" that was stored in the memory at step S11 (step S13). When the present detection signal (A/D value) from the Hall sensor 65 becomes within a predetermined range of values of the "temporary minimum A/D value" (for example, between −3 AD and +10 AD) (YES at step S13), the present detection signal (A/D value) from the Hall sensor 65 is determined as the "minimum A/D value" (step S14). The position of the diaphragm control slider 57 corresponding to this "minimum A/D value" serves as the "origin" of the diaphragm control slider 57. After the "origin" of the diaphragm control slider 57 is determined, the CPU 45 stops the stepwise movement of the diaphragm control slider 57 by the stepping motor 53 (step S15), and the initialization process of FIG. 10 ends.

When the diaphragm control slider 57 is moved downward in a stepwise manner again after bouncing (rebounding) at the lower extremity, the diaphragm control slider 57 often fails to return to the position identical to the "temporary origin" due to a tolerance of the detected A/D value. However, by utilizing the "minimum A/D value" that is obtained when the present detection signal (A/D value) from the Hall sensor 65 becomes within the predetermined range of values of the "temporary minimum A/D value", even in the case that the diaphragm control slider 57 fails to return to the position identical to the "temporary origin" (i.e., even if the detected A/D value has a tolerance), it is still possible to determine the "origin" of the diaphragm control slider 57. The predetermined range of values according to the present embodiment (between −3 AD and +10 AD) is merely an example, and this predetermined range of values can be changed freely in accordance with the circuit structure of the CPU 45 and the type of A/D conversion amplifier.

After a predetermined amount of time has passed upon the initialization-process command signal being inputted to the CPU 45, if the origin is not detected by the initialization process, the CPU 45 notifies the initialization processing error by the alarm system.

In the above-mentioned first initialization process (or simply "initialization process") in which the initialization-process command signal is input to the CPU 45, the CPU 45 activates the stepping motor 53 to move the diaphragm control slider 57 downwardly at high-speed in a stepwise manner toward the lower extremity (the first control end) at 3 ms/step (energized for 3 ms/step). When the Hall sensor (position detector) 65 detects the position to which the diaphragm control slider 57 has rebounded (bounced) after reaching the lower extremity (first control end), the CPU 45 stores this position in the memory (not shown) as the "temporary origin", and after the diaphragm control slider 57 has rebounded, the CPU 45 compares the current position of the diaphragm control slider 57 which is detected by the Hall sensor 65 with the "temporary origin" (which was detected by the Hall sensor 65 when the diaphragm control slider 57 rebounded) while activating the stepping motor 53 again to move the diaphragm control slider 57 downward at a low-speed towards the lower extremity at 5 ms/step (energized for 5 ms/step). When the position of the diaphragm control slider 57 detected by the Hall sensor 65 becomes within the predetermined range of the "temporary origin", this position is determined as the "origin". Accordingly, since the diaphragm control slider 57 that rebounded at the lower extremity is driven again slowly back toward the lower extremity by switching from the high-speed stepwise driving (movement) of 3 ms/step (energized for 3 ms/step) to the low-speed stepwise driving (movement) of 5 ms/step (energized for 5 ms/step), the influence of the impact that occurs due to the diaphragm control slider 57 rebounding at the lower extremity can be reduced mainly at the right side of the peak position shown in FIG. 11 after the diaphragm control slider 57 has rebounded, so that that origin of the diaphragm control slider 57 can be accurately detected in a short space of time.

Furthermore, in a state where the camera body 10 is attached to the interchangeable lens 100, since part of the biasing force of the diaphragm operatively-associated-rod biasing spring 121 is cancelled out by the biasing force of the diaphragm-control-slider biasing spring 67, and the diaphragm device 113 is positioned at an intermediately opened position between the maximum aperture and the minimum aperture, the amount of rebound of the diaphragm control slider 57 itself can be reduced combined with the biasing force of the diaphragm-control-slider biasing spring 67. Accordingly, the influence of the impact that occurs due to the diaphragm control slider 57 rebounding at the lower extremity can be reduced mainly at the left side of the peak position (the region toward the peak position after rebounding) shown in FIG. 11 after the diaphragm control slider 57 has rebounded, so that that origin of the diaphragm control slider 57 can be accurately detected in a short space of time.

Accordingly, the influence of impact due to the diaphragm control slider 57 rebounding from the lower extremity can be dramatically reduced and the origin of the diaphragm control slider 57 can be precisely detected at an extremely short space of time due to two functional effects of the illustrated embodiment; namely, the functional effect of driving the diaphragm control slider 57 that rebounded at the lower extremity slowly back toward the lower extremity by switching from the high-speed stepwise driving (movement) of 3 ms/step (energized for 3 ms/step) to the low-speed stepwise driving (movement) of 5 ms/step (energized for 5 ms/step) (the right side region of the peak position shown in FIG. 11 after the diaphragm control slider 57 rebounded), and the functional effect of the diaphragm-control-slider biasing spring 67 biasing the diaphragm control slider 57 toward the lower extremity (first control end) with a weaker biasing force than that of the diaphragm operatively-associated-rod biasing spring 121 (the left side region of the peak position shown in FIG. 11 after the diaphragm control slider 57 rebounded).

Furthermore, since the biasing force of the diaphragm control slider 57 via the diaphragm-control-slider biasing spring 67 is set smaller than the biasing force of the diaphragm operatively-associated rod 109 via the diaphragm operatively-associated-rod biasing spring 121, the stepwise driving (movement) of the diaphragm control slider 57 via the stepping motor 53 can be carried out smoothly and rapidly.

According to the diaphragm control apparatus of the interchangeable lens of the present embodiment, when a predetermined amount of time (for example 10 ms) has passed after completion of the first initialization process, the second initialization process (origin initialization process) is executed. This second initialization process includes the detection of the excitation pattern at the stop position of the stepping motor 53, as well as the detection of the initial excitation pattern. As shown in FIG. 11, in the second initialization process, the stepping motor 53 is driven so that the diaphragm control slider 57 can reciprocally move for a set number of steps, and when the diaphragm control slider 57 returns to the vicinity of the origin, the stepping motor 53 is in a free state. The position at which the stepping motor 53 has rotated to and stopped via the movement of the diaphragm control slider 57 is detected, and this position is set as the origin. The excitation pattern at this origin is set as the initial excitation pattern. This second initialization process is disclosed in Japanese Unexamined Patent Publication No. 2011-28241; however, the detailed structure thereof are not given herein due to this second initialization process not being directly related to the present invention.

Third Aspect of Embodiment

Figure 12:
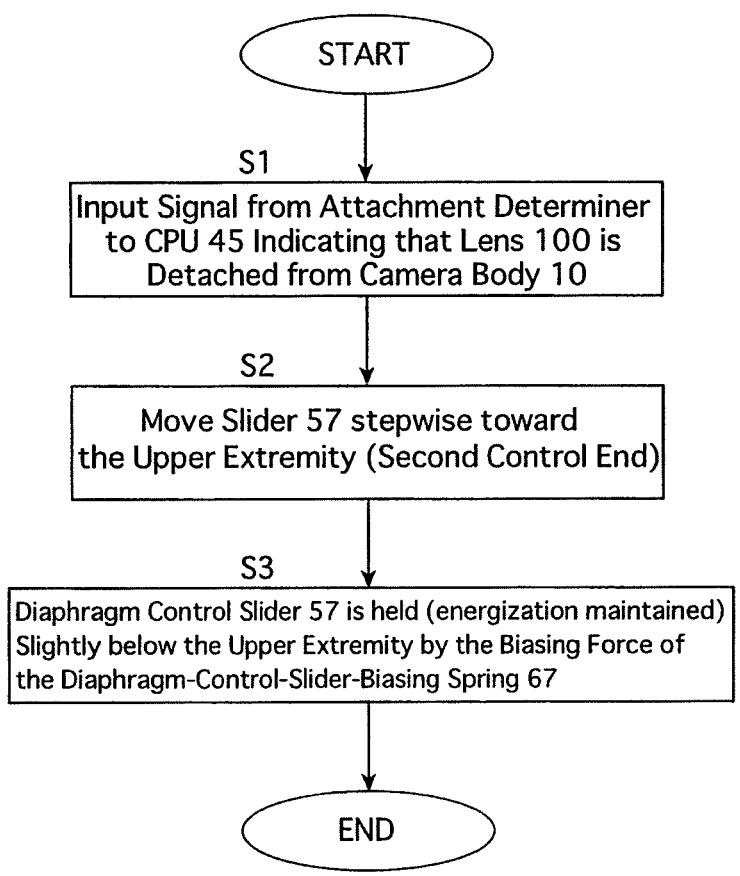
FIG. 12 is a flow chart showing the overall operation of the diaphragm control mechanism in which, when the interchangeable lens is attached to the camera body and the power is ON (i.e. the electrical power is supplied to a stepping motor), an attachment determiner determines the interchangeable lens is detached from the camera body (finalization process)

The third aspect of the present embodiment will now be discussed with reference to a flow chart of FIG. 12. According to the first and the second aspects of the present embodiment, the interchangeable lens 100 is attached to the camera body 10. In this state, when the stepping motor 53 is energized (power ON state), if the attachment determiner determines that the interchangeable lens 100 is detached from the camera body 10, the diaphragm device 113 carries out the finalization process. This is the third aspect of the present embodiment, which will be discussed as hereinbelow.

When the attachment determiner determines that the interchangeable lens 100 is detached from the camera body 10, a corresponding signal (for signifying that the interchangeable lens 100 is detached from the camera body 10) is input into the CPU 45 (step S1). In particular, when the engagement of the bayonet mount 18 with the bayonet mount 108 is released and the interchangeable lens 100 is detached from the camera body 10 (lens communication is disconnected), and also when the release of the lens lock release button 22 (see FIG. 1) is detected by a detection switch (not shown), the attachment determiner determines that the interchangeable lens 100 is detached from the camera body 10, and sends the corresponding signal to the CPU 45. Upon receiving this signal from the attachment determiner, the CPU 45 actuates the diaphragm drive control circuit 49, whereby the stepping motor 53 of the diaphragm control mechanism 51 is activated to drive (move) the diaphragm control slider 57 in a stepwise manner toward the upper extremity (the second control end) (step S2). Thereafter, the diaphragm control slider 57 is held (energization thereof is maintained) at a position slightly below the upper extremity (second control end) by the biasing force of the diaphragm-control-slider biasing spring 67 (step S3). At this instance, the end of the diaphragm control slider 57 is not in contact with the limit portion on the stop-down side (see FIG. 5). The diaphragm blades 115 of the diaphragm device 113 of the interchangeable lens 100 are fully stopped-down to the minimum aperture due to the biasing force of the diaphragm operatively-associated-rod biasing spring 121, when the interchangeable lens 100 is in a detached state from the camera body 10. Accordingly, when the interchangeable lens 100 is newly attached to the camera body 10, it is possible for the interchangeable lens 100 to be ready for a further initialization process (the fourth aspect of the present embodiment as discussed afterwards). This process plays a role in carrying out the finalization process and the initialization process promptly and securely in a series of lens replacement procedures.

Fourth Aspect of Embodiment

The fourth aspect of the present embodiment will now be discussed with reference to the flow chart of FIG. 13 and the timing chart of FIG. 11. The third aspect of the present embodiment relates to the control process when the interchangeable lens 100 is detached from the camera body 10 and also when the stepping motor 53 is energized (is in the power ON state). Whereas, in the fourth aspect of the present embodiment, when the attachment determiner determines that the interchangeable lens 100 is attached to the camera body 10, the stepping motor 53 drives the diaphragm control slider 57, which has been held (energization thereof is maintained) slightly below the upper extremity (second control end) by the biasing force of the diaphragm-control-slider biasing spring 67, in a stepwise manner to move downward in a stepwise manner towards the lower extremity (the first control end), whereby the origin is detected. This is the fourth aspect of the present embodiment, which will be referred to as "the first initialization process".

When the attachment determiner determines that the interchangeable lens 100 is attached to the camera body 10, the initialization-process command signal is input to the CPU 45 (step S1). The subsequent control process insteps S2 through S15 is substantially the same as that shown in the flow chart of the second aspect, namely, steps S2 through S15 of FIG. 10, and hence, a detailed explanation thereof will not be given. According to the fourth aspect of the present embodiment, when a predetermined amount of time (for example 10 ms) has passed after finishing the first initialization process, the second initialization process (the origin initialization process) is carried out, which includes the detection of the excitation pattern at the stop position of the stepping motor 53, as well as the detection of the initial excitation pattern.

When the attachment determiner determines that the interchangeable lens 100 is detached from the camera body 10, even if the power is ON, the CPU 45 prohibits the initialization process (the first initialization process) from being performed. Accordingly, an energy saving effect and prevention of a malfunction of the camera can be accomplished.

Fifth Aspect of Embodiment

The fifth aspect of the present embodiment will be discussed hereinbelow. In the first initialization process of the second aspect and the fourth aspect of the present embodiment, during movement of the diaphragm control slider 57 from the upper extremity to the lower extremity, if an impact is applied to the interchangeable lens 100, the CPU 45 carries out the first initialization return process. Similarly, when the interchangeable lens 100 is detached from the camera body 10 and when the power is OFF (when the stepping motor 53 is not energized), if the diaphragm control slider 57 moves to any inappropriate position due to a careless operation of the camera (for example, if the diaphragm control slider 57 moves to an intermediate position between the upper extremity and the lower extremity), and if the interchangeable lens 100 is attached to the camera body 10 and the power is switched ON (the stepping motor 53 is energized) in such a state, the CPU 45 also carries out the first initialization return process. This is the fifth aspect of the present embodiment.

According to the first initialization return process, the CPU 45 drives the diaphragm control slider 57 upward in a stepwise manner towards the upper extremity by a predetermined number of steps. When this stepwise upward movement is completed, the CPU 45 determines the position of the diaphragm control slider 57 relative to the maximum proximity position (the peak position) with respect to the pair of permanent magnets 64 (64a, 64b) and the Hall sensor 65. The CPU 45 determines whether the diaphragm control slider 57 is positioned at the upward side of the maximum proximity position (namely, on the left side of the peak position of FIG. 11), or the diaphragm control slider 57 is positioned at the downward side of the maximum proximity position (namely, on the right side of the peak position of FIG. 11). More specifically, the CPU 45 detects whether or not the detection signal (A/D value) from the Hall sensor 65 constantly increases during a series of eight steps. If the detection signal does not constantly increase during a series of eight steps, the CPU 45 determines that the position of the diaphragm control slider 57 is at the upward side. On the other hand, if the detection signal constantly increases during a series of eight steps, the CPU 45 determines that the position of the diaphragm control slider 57 is at the downward side.

When the detection signal (A/D value) from the Hall sensor 65 does not constantly increase during a series of eight steps, this state can be understood as the diaphragm control slider 57 being passed over the maximum proximity position (the peak position) with respect to the pair of permanent magnets 64 (64a, 64b) and the Hall sensor 65 before completion of the upward movement of the diaphragm control slider 57 by eight steps, and has traveled further upward. For example, this would be the case in which the diaphragm control slider 57 reaches the peak position at the sixth step of upward movement, and the diaphragm control slider 57 travels further upward by the remaining two steps, so that the diaphragm control slider 57 is positioned slightly closer to the upper extremity. Namely, according to the timing chart of FIG. 11, this state corresponds to the timing at which the detection signal (A/D value) from the Hall sensor 65 shifts from ascending (the left side of the peak and thereafter passing over the peak) to descending (the right side of the peak). In other words, this state corresponds to the timing at which the detection signal (A/D value) from the Hall sensor 65 shifts from increasing to decreasing.

On the other hand, when the detection signal (A/D value) from the Hall sensor 65 constantly increases during a series of eight steps, this state can be understood as the diaphragm control slider 57 not reaching the maximum proximity position, even though the distance between the diaphragm control slider 57 and the maximum proximity position (the peak position) with respect to the pair of permanent magnets 64 (64a, 64b) and the Hall sensor 65 has become closer after completion of upward movement of the diaphragm control slider 57 for eight steps. Namely, according to the timing chart of FIG. 11, this state corresponds to the timing at which the detection signal (A/D value) from the Hall sensor 65 keeps on ascending (from the right side of the peak towards the peak). In other words, this state corresponds to the timing at which the detection signal (A/D value) from the Hall sensor 65 continues to increase.

When the position of the diaphragm control slider 57 is positioned closer to the upper extremity, the CPU 45 actuates the stepping motor 53 to drive the diaphragm control slider 57 in a stepwise manner towards the lower extremity while progressively reducing the multi-phase stepwise movement speed of the diaphragm control slider 57 from the fastest speed (i.e., 0.9 ms/step; step S5 of FIG. 10 and FIG. 13) to a lower speed. Accordingly, when the diaphragm control slider 57 is positioned in the vicinity of the peak position and thereafter moves downward via ordinary downward control (steps S5 through S15 of FIG. 10 and FIG. 13), the first initialization return process and the first initialization process can be carried out promptly even in an irregular condition as discussed in the fifth aspect of the present embodiment.

Figure 10:
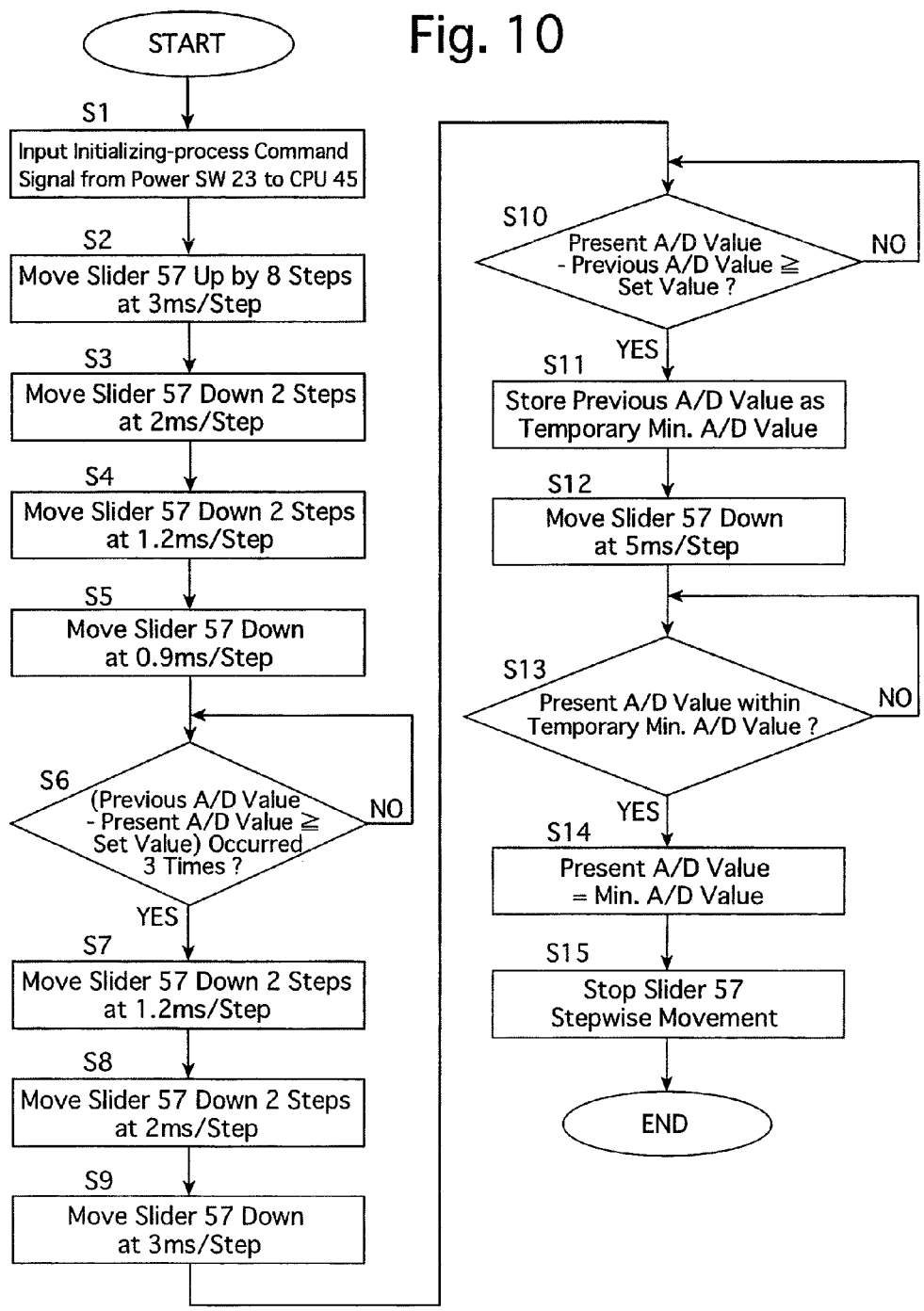
FIG. 10 is a flowchart showing the initialization process (first initialization process)
Figure 13:
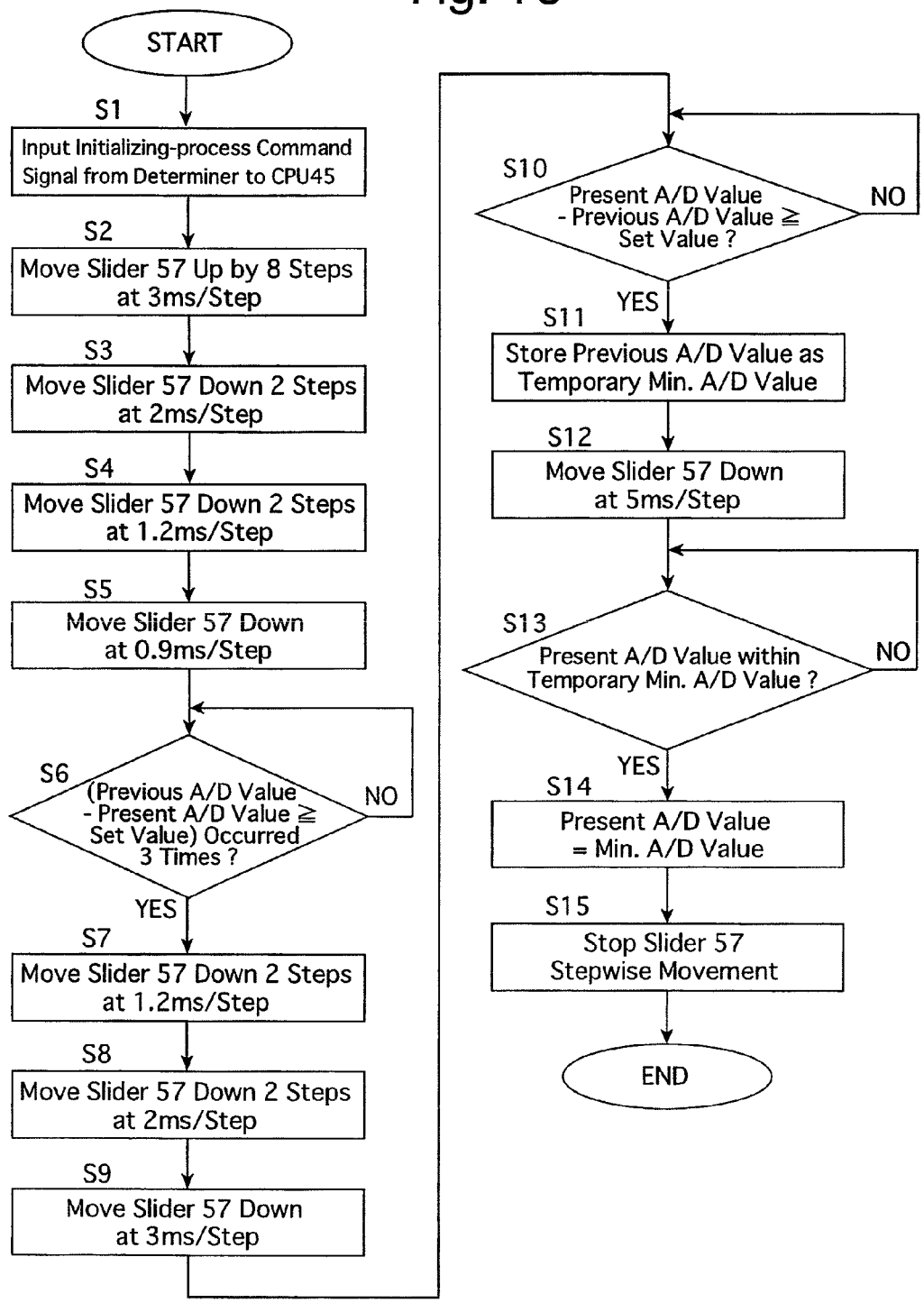
FIG. 13 is a flow chart showing another initialization process (first initialization process) following the finalization process of FIG. 12.

When the position of the diaphragm control slider 57 is closer to the lower extremity, the CPU 45 actuates the stepping motor 53 to drive the diaphragm control slider 57 in a stepwise manner towards the lower extremity, at the lowest speed of the multi-phase step movement speed of the diaphragm control slider 57 (i.e., 3 ms/step: step S9 of FIG. 10 and FIG. 13). Accordingly, when the diaphragm control slider 57 is positioned in the close vicinity of the temporary origin point at the origin, and thereafter the diaphragm control slider 57 bounces (rebounds) at the lower extremity, any potential impact on the diaphragm control slider 57 can be reduced.

As discussed above, according to the illustrated embodiment of the present invention, when the interchangeable lens 100 is attached to the camera body 10 and the power switch 23 is switched from the power ON state to the power OFF state, the finalization process is carried out (the first aspect). Furthermore, when the interchangeable lens 100 is attached to the camera body 10 and the power is ON (i.e., the stepping motor 53 is in an energized state), if the attachment determiner determines that the interchangeable lens 100 is detached from the camera body 10, the finalization process is carried out (the third aspect). However, the timing in which the finalization process can be applied is not limited to these examples.

For example, when the interchangeable lens 100 is attached to the camera body 10 and the power is ON, the finalization process can also be carried out if the power switch (or a relay switch of power circuit) automatically switches from the power ON state to the power OFF state by auto-power-off mode (including a "sleep" mode) that is caused by a non-operation state of the camera for a predetermined period of time.

In addition, the finalization process can also be carried out in cooperation with the opening of an SD card slot cover. In such a case, the SD card slot cover is provided with a cover open/close detection switch in order to protect the saved data, so that when the cover open/close detection switch detects that the SD card slot cover is open, the power switch automatically switches from the power ON state to the power OFF state. With this structure, the finalization process can also be carried out when the interchangeable lens 100 is attached to the camera body 10 and the power is ON, if the power switch automatically switches from the power ON state to the power OFF state by opening an SD card slot cover.

According to the illustrated embodiment of the present invention, when the power switch 23 is operated from the power OFF state to the power ON state, and accordingly, the stepping motor (driving source) 53 is switched from the non-energized state to the energized state, the initialization process is carried out (the second aspect). Furthermore, when the interchangeable lens 100 is detached from the camera body 10 and the power is ON (i.e., in the energized state of the stepping motor 53), if the attachment determiner determines that the interchangeable lens 100 is attached to the camera body 10, the initialization process is carried out (the fourth aspect). However, the timing in which the initialization process can be applied is not limited to these examples.

For example, the initialization process can also be carried out when the release button is depressed halfway in a sleep mode of the camera, or when the release button is depressed halfway after closing the SD card slot cover.

According to the illustrated embodiment, the diaphragm control mechanism for an interchangeable lens camera is applied to the SLR digital camera system having a split mirror for the optical viewfinder, as illustrated in FIG. 3. However, the diaphragm control mechanism for an interchangeable lens camera of the present embodiment can also be applied to almost any type of interchangeable lens camera, so long as such camera is provided with a photographing lens having a diaphragm mechanism, and with a camera body having a drive motor for opening and closing of this diaphragm mechanism. In particular, the diaphragm control mechanism of the present embodiment is extremely useful for use in a mirrorless interchangeable lens camera having no split mirror for an optical viewfinder.

In general, since the mirrorless interchangeable lens camera has no split mirror for optical viewfinder, if the diaphragm mechanism of the photographing lens is not in the fully stopped-down state, there is a greater risk of sunlight entering into the camera body from the opening of this diaphragm mechanism of the photographing lens, which would then damage the dark box of the camera body or other camera components/parts (such as burning out of image sensor or melting of the shutter mechanism). Whereas, according to the present embodiment, the diaphragm device 113 actuates the diaphragm blades 115 to form a minimum aperture, thereby preventing sunlight from entering through the opening of the diaphragm device 113 of the photographing lens 100 to the camera body 10. Accordingly, the risk of damage to the dark box of the camera body 10 or to other camera components/parts (such as burning out of image sensor or melting of shutter mechanism) can be prevented. Note that with regard to an ordinary SLR camera having a split mirror for optical viewfinder, even if sunlight were to enter into the camera body from the opening of the diaphragm device, the risk of damage to the dark box of the camera body or to the camera components/parts (such as burning out of image sensor or melting of shutter mechanism) is considerably low since most of the sunlight would pass through the viewfinder via the split mirror.

According to the illustrated embodiment, the diaphragm device 113 forms the maximum aperture when the diaphragm control slider 57 is positioned at the lower extremity and the diaphragm device 113 forms the minimum aperture when the diaphragm control slider 57 is positioned at the upper extremity. However, it is of course possible to modify the structure so that the diaphragm device 113 forms the maximum aperture when the diaphragm control slider 57 is positioned at the upper extremity and the diaphragm device 113 forms the minimum aperture when the diaphragm control slider 57 is positioned at the lower extremity. In such a modified structure, the upper extremity of the diaphragm control slider 57 corresponds to the above-described "first control end," and the lower extremity of the diaphragm control slider 57 corresponds to the above-described "second control end".

According to the illustrated embodiment, the diaphragm control slider 57 moves in the vertical (upward/downward) direction of the camera body. However, it is also possible to move the diaphragm control slider 57 in the horizontal (lateral) direction of the camera body. In such a modified structure, one and the other ends of the diaphragm control slider 57 in the horizontal direction correspond to the "first control end" and the "second control end", respectively.

Furthermore, according to the present embodiment, when the interchangeable lens 100 is attached to the camera body 10 and when the diaphragm control slider 57 is positioned at the upper extremity (the second control end including the vicinity area thereof), the diaphragm operatively-associated rod 109 is not in contact with the diaphragm control projection 19 of the diaphragm control slider 57 (in other words, the diaphragm operatively-associated rod 109 does not move integrally with the diaphragm control projection 19 of the diaphragm control slider 57), as shown in FIG. 5. However, the present invention is not limited to this structure. For example, when the interchangeable lens 100 is attached to the camera body 10 and when the diaphragm control slider 57 is positioned at the upper extremity (the second control end including the vicinity area thereof), it is also possible to provide another structure in which the diaphragm operatively-associated rod 109 becomes in contact with the diaphragm control projection 19 of the diaphragm control slider 57 (in other words, the diaphragm operatively-associated rod 109 moves integrally with the diaphragm control projection 19 of the diaphragm control slider 57), so long as the diaphragm device 113 maintains the minimum aperture (i.e., so long as the aperture does not become larger than the minimum aperture).

According to the present embodiment, the A/D value is first obtained by A/D conversion from the voltage detected by the Hall sensor 65; the obtained A/D value serves as the detection signal of the Hall sensor 65, whereby the initialization process is carried out. However, it is also possible to carry out the initialization process by directly reading the voltage detected by the Hall sensor 65.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A diaphragm control apparatus of an interchangeable lens camera, comprising:
    a photographing lens provided with an adjustable diaphragm device, in which an aperture is changeable between a maximum aperture and a minimum aperture;
    a camera body to which said photographing lens is detachably attached, said camera body being provided with a stepping motor for driving said diaphragm device to change between said maximum aperture and said minimum aperture when said photographing lens is attached to said camera body;
    a diaphragm control slider provided in said camera body, wherein said diaphragm control slider is driven by said stepping motor between a first control end that corresponds to said maximum aperture of said diaphragm device and a second control end that corresponds to said minimum aperture of said diaphragm device;
    a position detector provided in said camera body, wherein said position detector detects the position of said diaphragm control slider;
    an input device, into which an initialization-process command signal is input, wherein said initialization-process command signal commands an initialization process to commence in the camera body; and
    a controller which, upon said initialization-process command signal being input to said input device, drives said diaphragm control slider toward said first control end at high-speed in a stepwise manner via said stepping motor, stores in a memory, as a temporary origin, a position detected by said position detector to which the diaphragm control slider has rebounded after reaching said first control end, and after said diaphragm control slider has rebounded, said controller compares a current position of said diaphragm control slider, detected by said position detector, with said temporary origin while activating the stepping motor to move said diaphragm control slider at a low-speed towards said first control end,
    wherein, when said current position of said diaphragm control slider, detected by said position detector, is within a predetermined range of said temporary origin, said controller determines said current position as the origin of said diaphragm control slider.

2. The diaphragm control apparatus of an interchangeable lens camera according to claim 1, wherein said camera body is provided with a diaphragm-control-slider biasing spring which biases said diaphragm control slider toward said first control end.

3. The diaphragm control apparatus of an interchangeable lens camera according to claim 2, wherein said photographing lens comprises:
- a diaphragm operatively-associated rod which opens and shuts said diaphragm device between said maximum aperture and said minimum aperture by being rotated via the operatively associated movement of said diaphragm control slider provided in said camera body; and
- a diaphragm operatively-associated-rod biasing spring which biases said diaphragm operatively-associated rod toward said minimum aperture of said diaphragm device.

4. The diaphragm control apparatus of an interchangeable lens camera according to claim 3, wherein the biasing force of said diaphragm control slider via said diaphragm-control-slider biasing spring is smaller than the biasing force of said diaphragm operatively-associated rod via said diaphragm operatively-associated-rod biasing spring.

5. The diaphragm control apparatus of an interchangeable lens camera according to claim 1, wherein said camera body comprises:
- a power switch for performing an input operation for switching between a power ON state in which said stepping motor is capable of being energized, and a power OFF state in which said stepping motor is not capable of being energized,
- wherein said initialization-process command signal is input into said input device when said input operation, for switching said stepping motor from a power OFF state to a power ON state, is performed via said power switch.

6. The diaphragm control apparatus of an interchangeable lens camera according to claim 1, wherein said camera body comprises:
- an attachment determiner which determines whether or not said photographing lens is attached to said camera body,
- wherein, in the power ON state with said photographing lens detached from said camera body while said stepping motor is energized, said initialization-process command signal is input into said input device when said attachment determiner determines that said photographing lens is attached to said camera body.

7. The diaphragm control apparatus of an interchangeable lens camera according to claim 1, wherein said position detector comprises a pair of permanent magnets which are mounted on said diaphragm control slider and which move integrally with said diaphragm control slider, and a Hall sensor fixed on an intermediate position between said first control end and said second control end; and
- wherein, when said controller moves said diaphragm control slider in a stepwise manner from said second control end to said first control end, said controller progressively accelerates the stepwise movement speed of said diaphragm control slider until said diaphragm control slider reaches a maximum proximity position between said permanent magnets and said Hall sensor, and thereafter said controller progressively decelerates said stepwise movement speed of said diaphragm control slider after said diaphragm control slider passes said maximum proximity position between said permanent magnets and said Hall sensor.

8. The diaphragm control apparatus of an interchangeable lens camera according to claim 7, wherein during the stepwise movement of said diaphragm control slider by said controller from said second control end to said first control end, said controller moves said diaphragm control slider in a stepwise manner towards said second control end for a predetermined number of steps,
- wherein, when said stepwise movement is completed, said controller determines whether a position of said diaphragm control slider is closer to one of said second control end and said first control end with respect to said maximum proximity position between said permanent magnets and said Hall sensor,
- wherein, when said diaphragm control slider is determined as being positioned closer to said second control end, said controller moves said diaphragm control slider in a stepwise manner towards said first control end by progressively decelerating said stepwise movement speed from a fastest speed of said stepwise movement speed, and
- wherein, when said diaphragm control slider is determined as being positioned closer to said first control end, said controller moves said diaphragm control slider in a stepwise manner towards said first control end at a slowest speed of said stepwise movement speed.

9. The diaphragm control apparatus of an interchangeable lens camera according to claim 1, wherein, when said initialization-process command signal is input to said input device, said controller drives said diaphragm control slider in a stepwise manner toward said second control end by a predetermined number of steps via said stepping motor when said diaphragm control slider is not positioned at said second control end.

10. The diaphragm control apparatus of an interchangeable lens camera according to claim 1, wherein said camera body is provided with an alarm which notifies a processing error of said interchangeable lens camera, and
- wherein, when said origin cannot be detected even after a predetermined amount of time has lapsed from the time when said initialization-process command signal is input to said input device, said controller notifies, via said alarm, an initialization processing error.

11. A diaphragm control apparatus of an interchangeable lens camera, comprising:
- a photographing lens provided with an adjustable diaphragm device, in which an aperture lead screw is changeable between a maximum aperture and a minimum aperture;
- a camera body to which said photographing lens is detachably attached, said camera body being provided with a drive motor for driving said diaphragm device to change said aperture between said maximum aperture and said minimum aperture when said photographing lens is attached to said camera body;
- a diaphragm control slider which is provided in said camera body, wherein said diaphragm control slider moves by rotation of said drive motor between a first control end corresponding to said maximum aperture of said diaphragm device and a second control end corresponding to said minimum aperture of said diaphragm device;
- a diaphragm-control-slider biasing spring which is provided in said camera body, wherein said diaphragm-control-slider biasing spring biases said diaphragm control slider toward said first control end;
- a diaphragm operatively-associated rod, provided in said photographing lens, which opens and shuts said diaphragm device between said maximum aperture and said minimum aperture by being rotated via the operatively associated movement of said diaphragm control slider provided in said camera body; and a diaphragm operatively-associated-rod biasing spring, provided in said photographing lens, which biases said diaphragm operatively-associated rod toward said minimum aperture of said diaphragm device;

wherein the biasing force of said diaphragm-control-slider biasing spring that is applied to bias said diaphragm control slider toward said first control end, which corresponds to said maximum aperture of said diaphragm device, is smaller than the biasing force of said diaphragm operatively-associated-rod biasing spring that is applied to bias said diaphragm operatively-associated rod toward said minimum aperture of said diaphragm device, and wherein, when said photographing lens is attached to said camera body, part of said biasing force of said diaphragm operatively-associated-rod biasing spring is cancelled by said biasing force of said diaphragm-control-slider biasing spring, and said diaphragm device is positioned at an intermediate open position between said maximum aperture and said minimum aperture.

12. The diaphragm control apparatus of an interchangeable lens camera according to claim 11, wherein said camera body comprises:

a power switch for performing an input operation for switching between a power ON state in which said stepping motor is capable of being energized, and a power OFF state in which said stepping motor is not capable of being energized, wherein said initialization-process command signal is input into said input device when said input operation, for switching said stepping motor from a power OFF state to a power ON state, is performed via said power switch.

13. The diaphragm control apparatus of an interchangeable lens camera according to claim 11, wherein said camera body comprises:

an attachment determiner which determines whether or not said photographing lens is attached to said camera body, wherein, in the power ON state with said photographing lens detached from said camera body while said stepping motor is energized, said initialization-process command signal is input into said input device when said attachment determiner determines that said photographing lens is attached to said camera body.

14. The diaphragm control apparatus of an interchangeable lens camera according to claim 11, wherein said position detector comprises a pair of permanent magnets which are mounted on said diaphragm control slider and which move integrally with said diaphragm control slider, and a Hall sensor fixed on an intermediate position between said first control end and said second control end; and wherein, when said controller moves said diaphragm control slider in a stepwise manner from said second control end to said first control end, said controller progressively accelerates the stepwise movement speed of said diaphragm control slider until said diaphragm control slider reaches a maximum proximity position between said permanent magnets and said Hall sensor, and thereafter said controller progressively decelerates said stepwise movement speed of said diaphragm control slider after said diaphragm control slider passes said maximum proximity position between said permanent magnets and said Hall sensor.

15. The diaphragm control apparatus of an interchangeable lens camera according to claim 14, wherein during the stepwise movement of said diaphragm control slider by said controller from said second control end to said first control end, said controller moves said diaphragm control slider in a stepwise manner towards said second control end for a predetermined number of steps, wherein, when said stepwise movement is completed, said controller determines whether a position of said diaphragm control slider is closer to one of said second control end and said first control end with respect to said maximum proximity position between said permanent magnets and said Hall sensor, wherein, when said diaphragm control slider is determined as being positioned closer to said second control end, said controller moves said diaphragm control slider in a stepwise manner towards said first control end by progressively decelerating said stepwise movement speed from a fastest speed of said stepwise movement speed, and wherein, when said diaphragm control slider is determined as being positioned closer to said first control end, said controller moves said diaphragm control slider in a stepwise manner towards said first control end at a slowest speed of said stepwise movement speed.

16. The diaphragm control apparatus of an interchangeable lens camera according to claim 11, wherein, when said initialization-process command signal is input to said input device, said controller drives said diaphragm control slider in a stepwise manner toward said second control end by a predetermined number of steps via said stepping motor when said diaphragm control slider is not positioned at said second control end.

17. The diaphragm control apparatus of an interchangeable lens camera according to claim 11, wherein said camera body is provided with an alarm which notifies a processing error of said interchangeable lens camera, and wherein, when said origin cannot be detected even after a predetermined amount of time has lapsed from the time when said initialization-process command signal is input to said input device, said controller notifies, via said alarm, an initialization processing error.

* * * * *